United States Patent
Schwager et al.

(10) Patent No.: US 7,566,033 B2
(45) Date of Patent: Jul. 28, 2009

(54) METHOD AND APPARATUS FOR CONTROLLING DISPLAY ROTATION ON AN INFORMATION HANDLING SYSTEM

(75) Inventors: Mark A. Schwager, Austin, TX (US);
Kevin L. Kamphuis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 245 days.

(21) Appl. No.: 11/227,391

(22) Filed: Sep. 15, 2005

(65) Prior Publication Data

US 2007/0057127 A1 Mar. 15, 2007

(51) Int. Cl.
*A47F 5/00* (2006.01)
(52) U.S. Cl. .................... 248/125.9; 361/681
(58) Field of Classification Search ................ 361/681; 248/125.9
See application file for complete search history.

(56) References Cited

U.S. PATENT DOCUMENTS

| | | | |
|---|---|---|---|
| 5,559,670 A * | 9/1996 | Flint et al. ................ | 361/681 |
| 6,262,885 B1 * | 7/2001 | Emma et al. ............... | 361/683 |
| 6,266,236 B1 * | 7/2001 | Ku et al. .................... | 361/681 |
| 6,392,877 B1 | 5/2002 | Iredale | |
| 6,665,175 B1 * | 12/2003 | deBoer et al. .............. | 361/681 |
| 6,788,527 B2 | 9/2004 | Doczy et al. | |
| 6,845,005 B2 | 1/2005 | Shimano et al. | |
| 6,903,927 B2 | 6/2005 | Anlauff | |
| 7,181,238 B2 * | 2/2007 | Chiang .................... | 455/556.1 |
| 7,203,058 B2 * | 4/2007 | Hong ........................ | 361/681 |
| 7,283,355 B2 * | 10/2007 | Han .......................... | 361/683 |
| 2005/0105263 A1 * | 5/2005 | Tanaka et al. ............. | 361/683 |

* cited by examiner

*Primary Examiner*—Lisa Lea-Edmonds
*Assistant Examiner*—Ingrid Wright
(74) *Attorney, Agent, or Firm*—Haynes and Boone, LLP

(57) ABSTRACT

A display rotation controlling apparatus includes a chassis base, a plurality of support arms rotatably coupled to the chassis base, at least one support arm including a display coupling member, and a display rotatably coupled to the support arms, the display including at least one support arm coupling member. The display coupling member and support arm coupling member are engaged in order to orient the display in a notebook mode and may be disengaged to orient the display in a tablet mode.

10 Claims, 18 Drawing Sheets

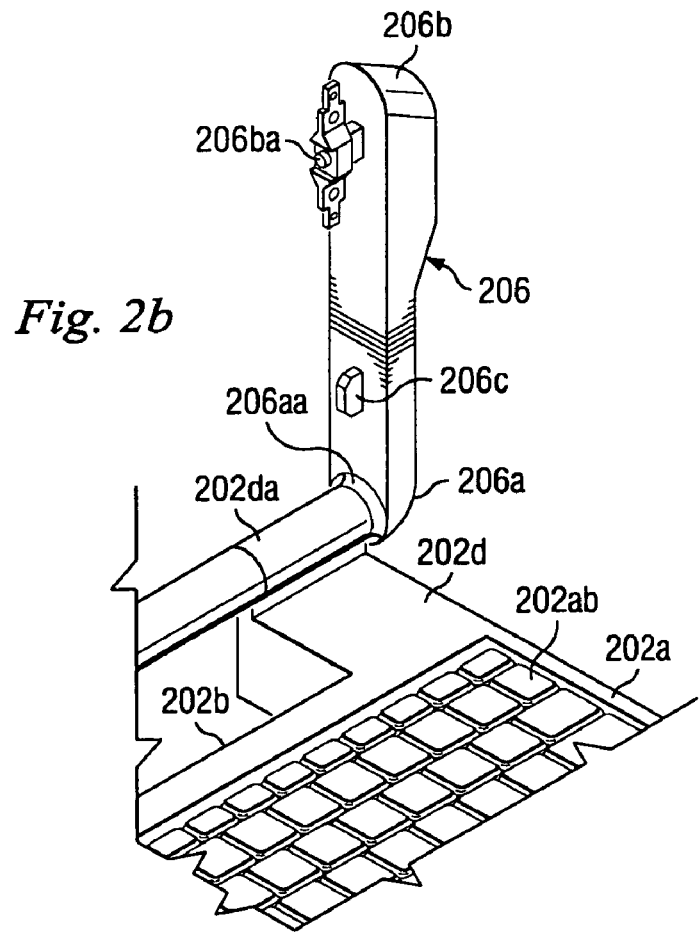
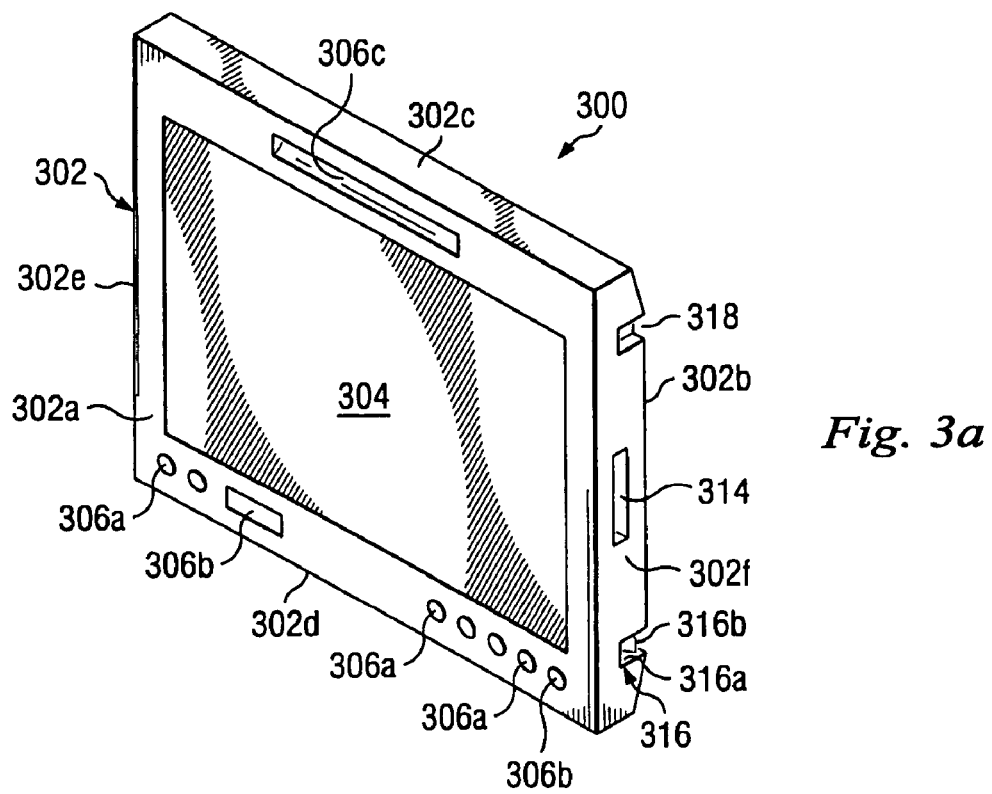

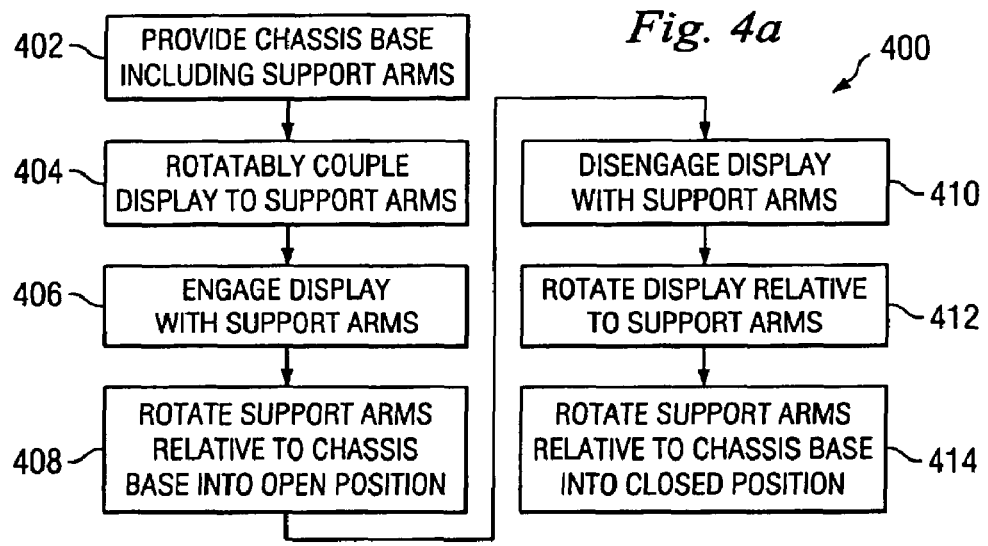
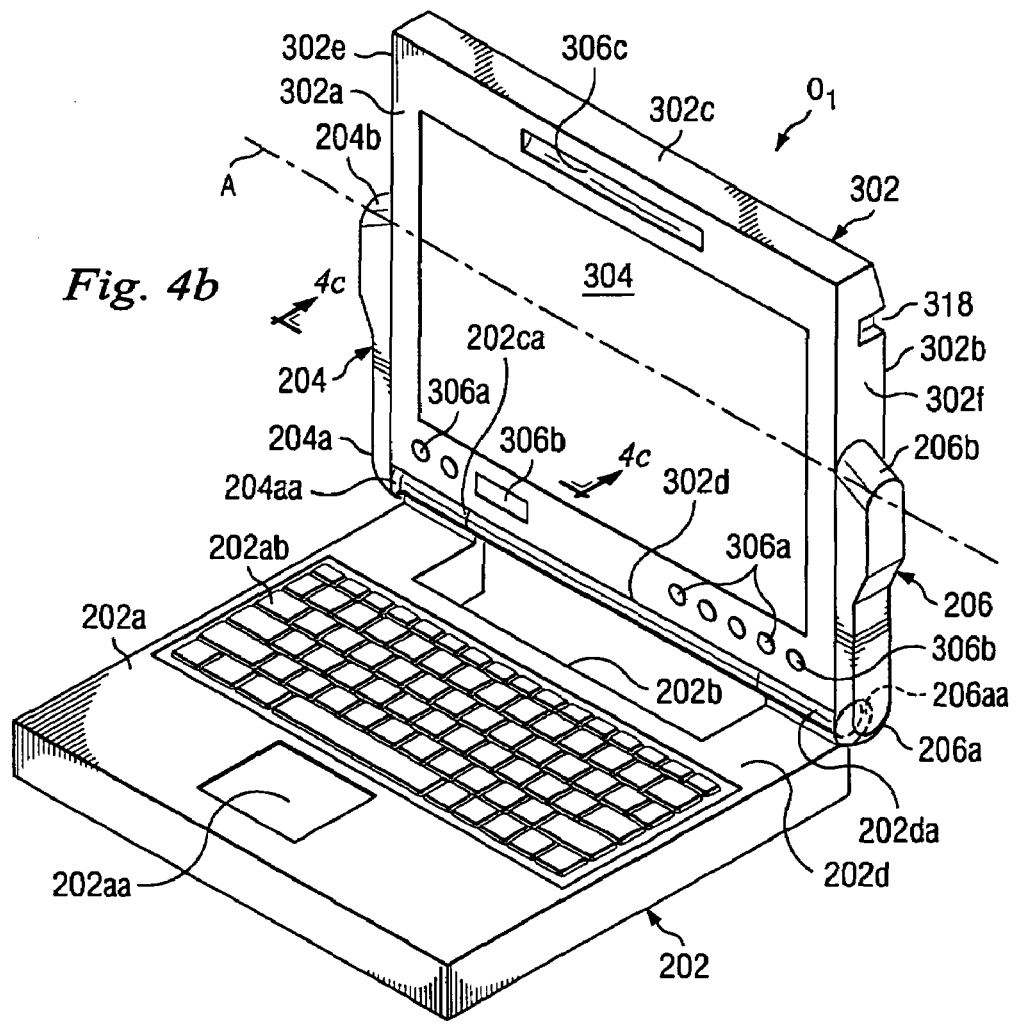

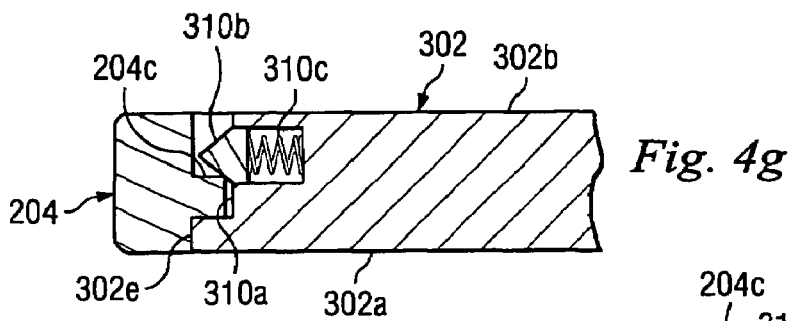
Fig. 4g
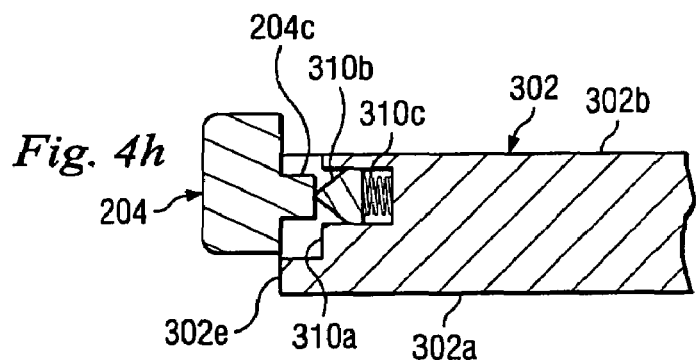
Fig. 4h
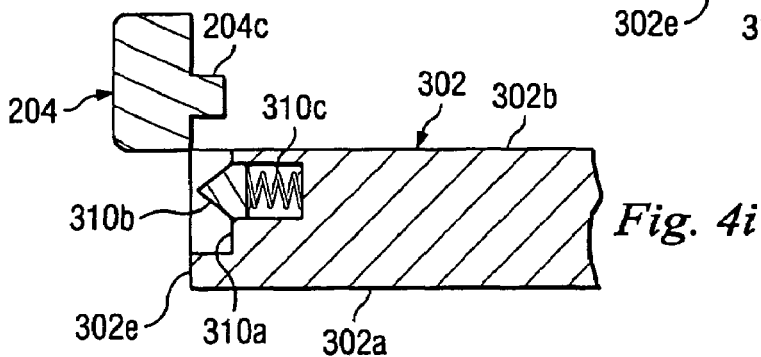
Fig. 4i
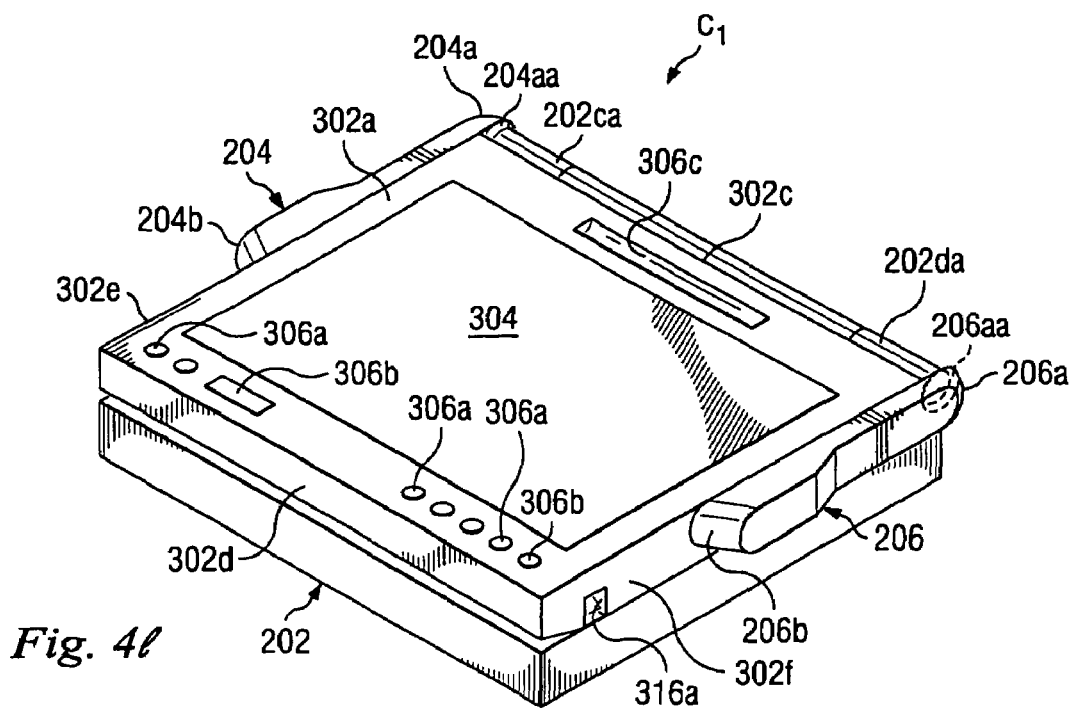
Fig. 4ℓ

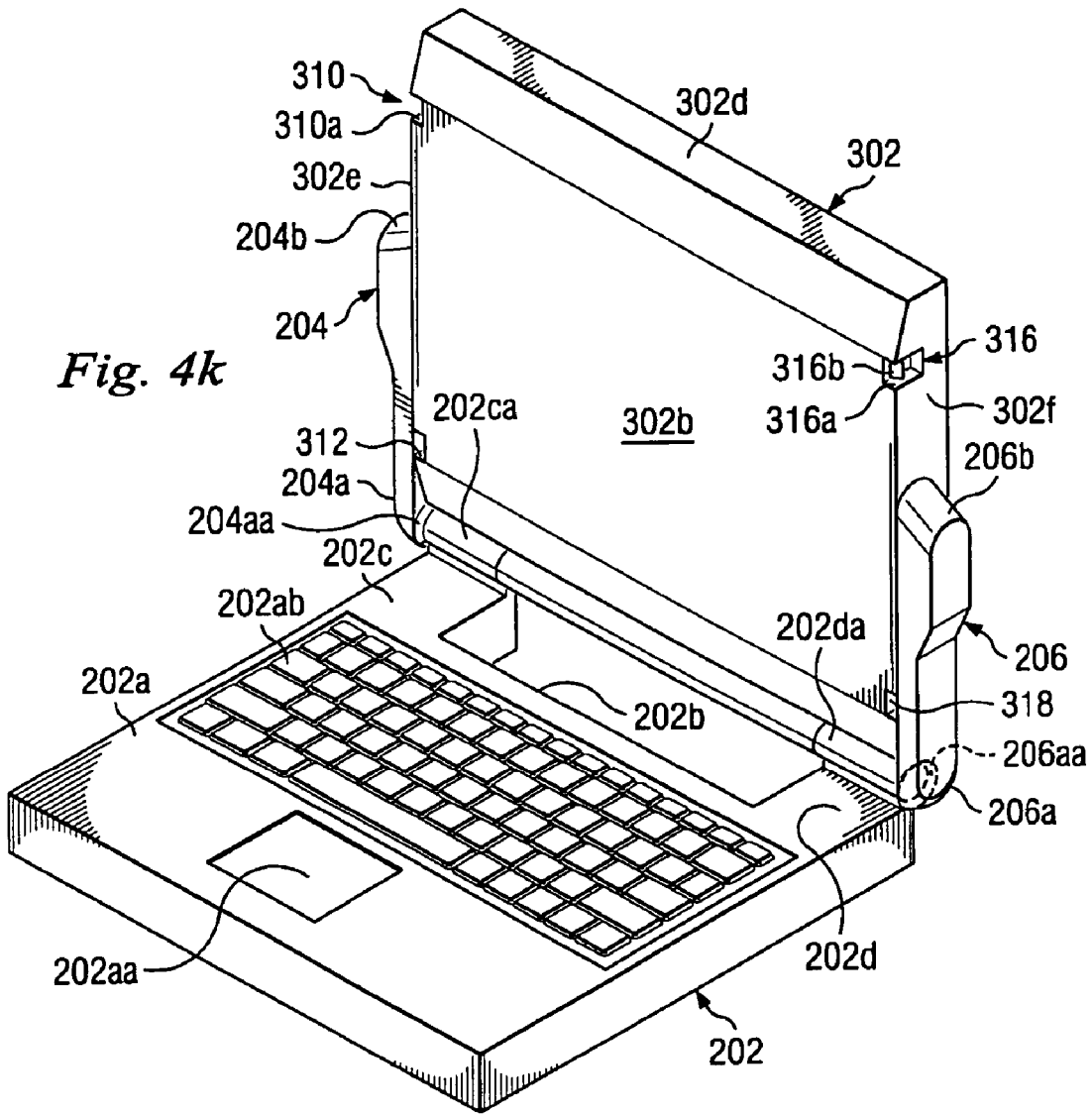

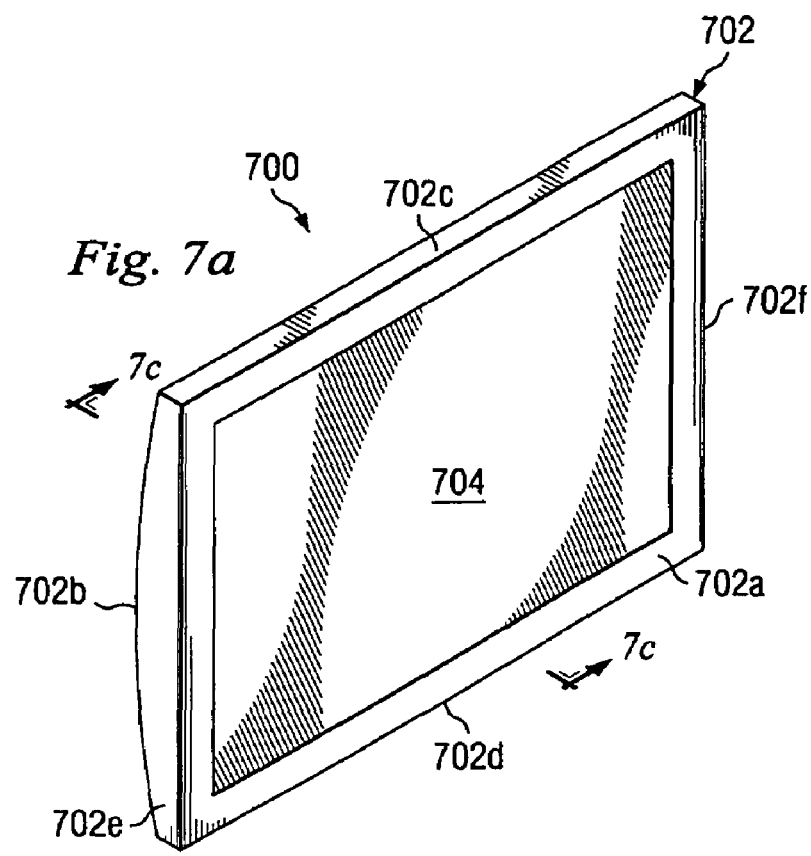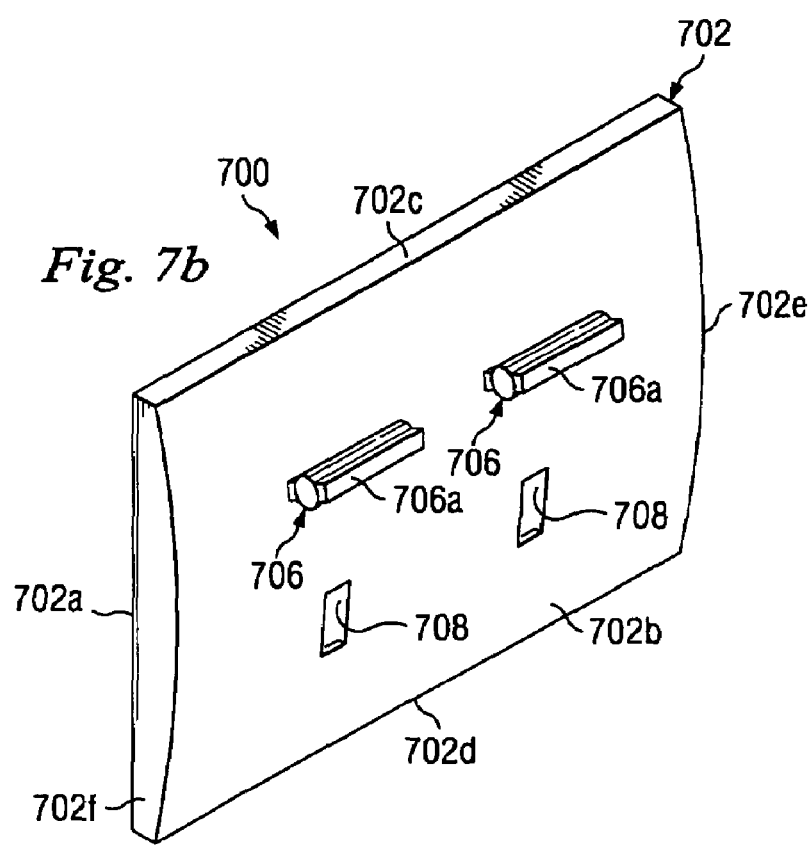

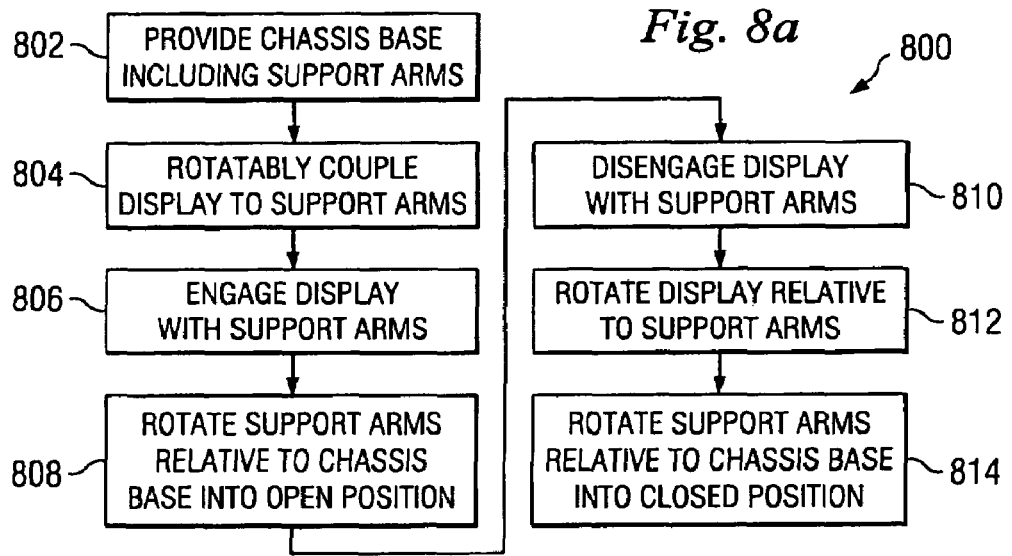
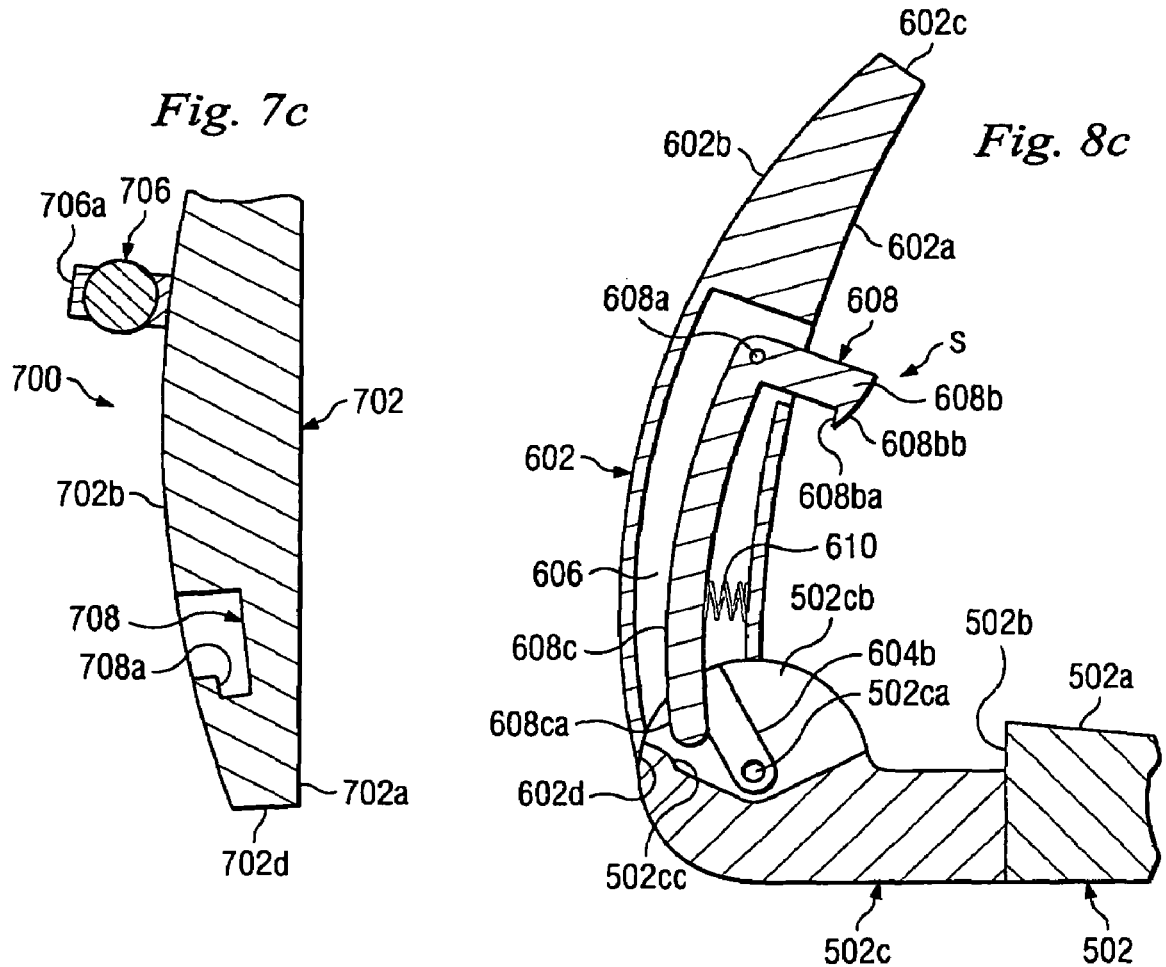

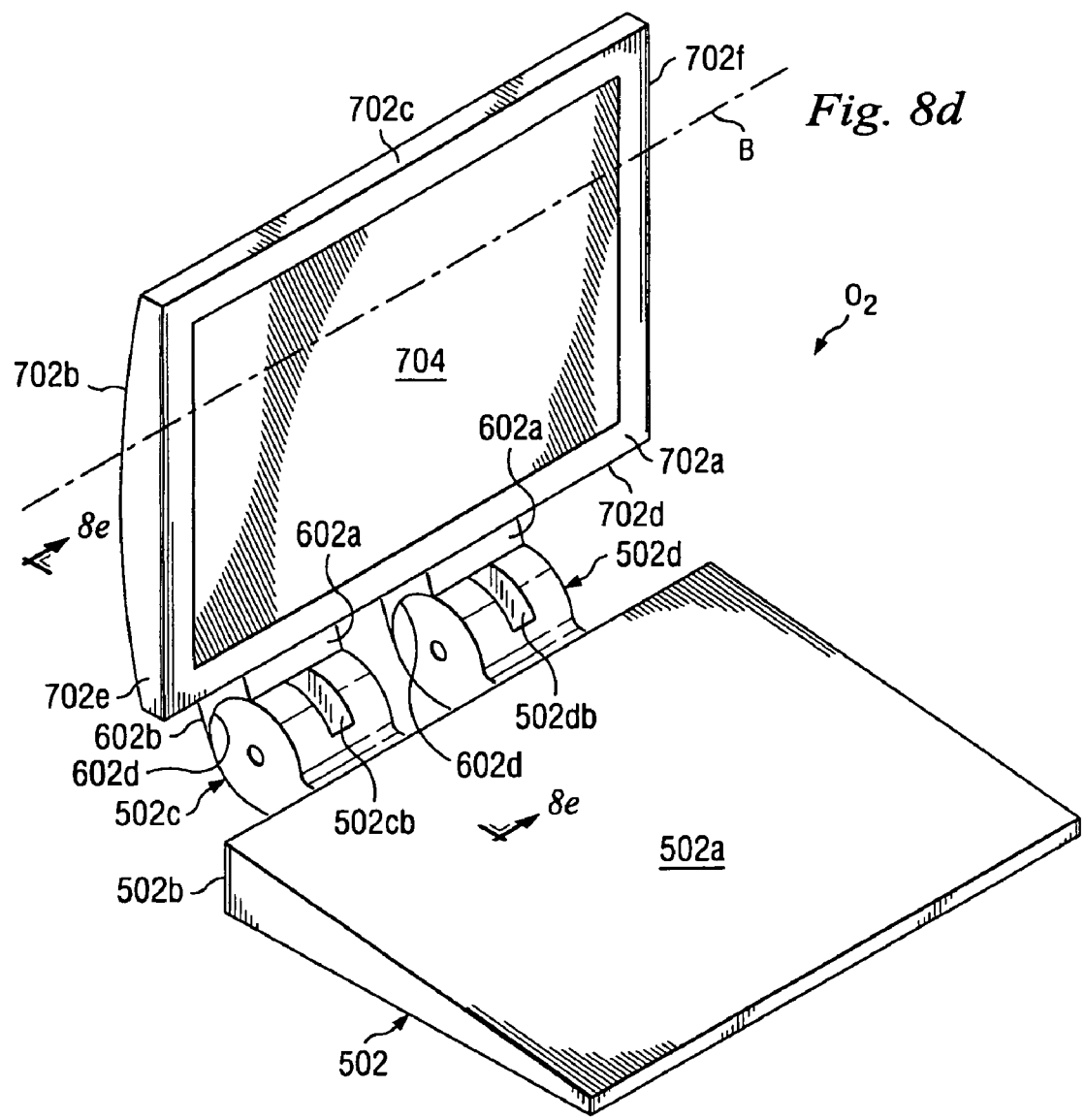

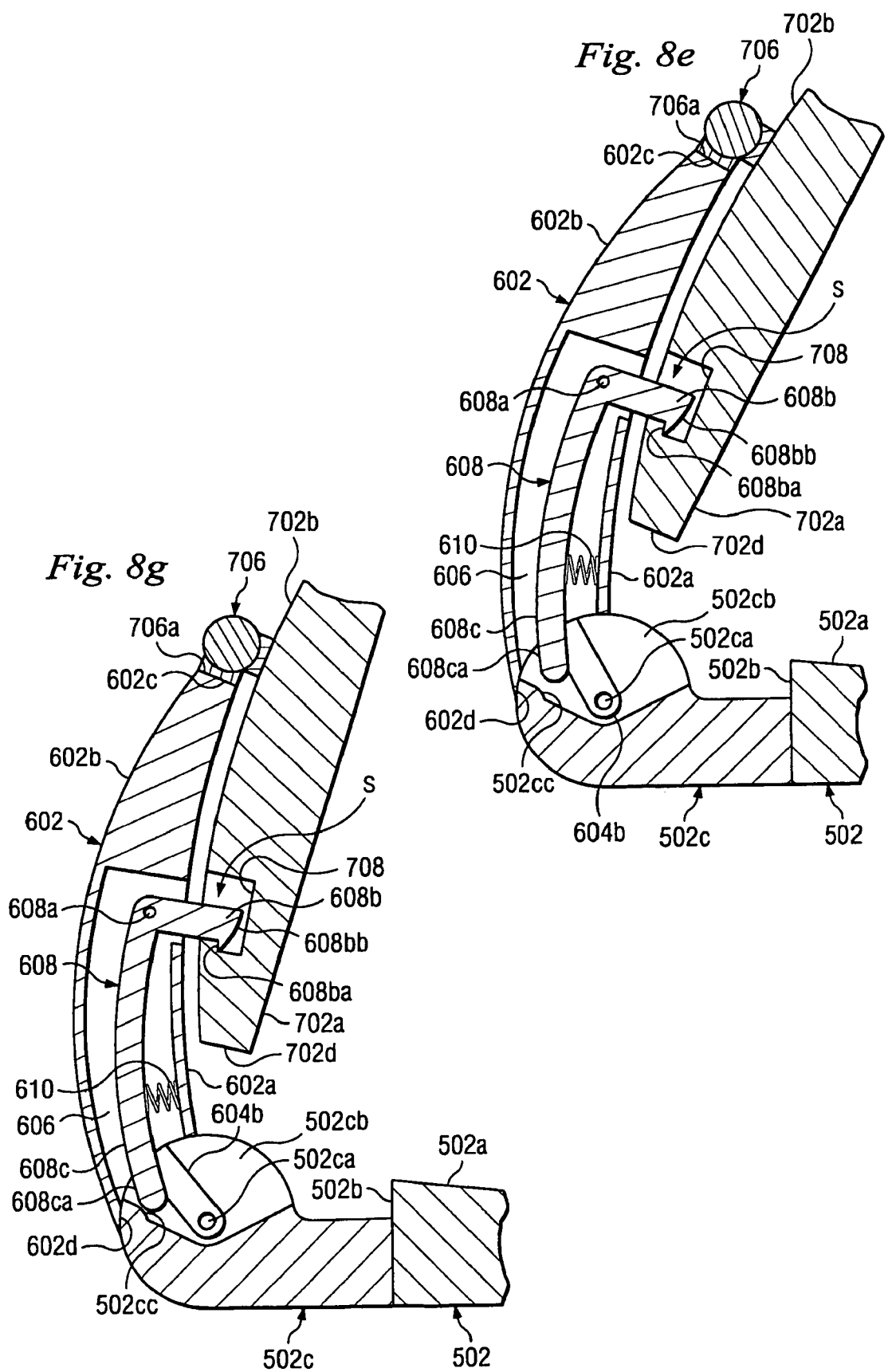

METHOD AND APPARATUS FOR CONTROLLING DISPLAY ROTATION ON AN INFORMATION HANDLING SYSTEM

BACKGROUND

The present disclosure relates generally to information handling systems, and more particularly to controlling display rotation on an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, tablet information handling systems, include a display which is coupled to a chassis such that the display is allowed to rotate 180 degrees relative to its supports. For example, the display may be rotatably coupled to a plurality of support arms which are rotatably coupled to the chassis. The support arms may then be rotated from a closed position where the display is parallel to and engaged with the chassis with the monitor on the display facing the chassis, to an open position where the display is perpendicular to the chassis, allowing the tablet information handling system to be used in a notebook mode. Furthermore, with the support arms in the open position, the display may be rotated 180 degrees relative to the support arms. The support arms may then be moved to the closed position such that the display is parallel to and engage with the chassis and the monitor is facing away from the chassis, allowing the tablet information handling system to be used in a tablet mode.

It is desirable to provide the rotation coupling between the support arms and the chassis such that the support arms may be rotated without the chassis lifting and to design the rotational coupling between the display and the support arms such that the display may be rotated smoothly and easily. However, this can result in the display being allowed to rotate relative to the support arms when the support arms are moved from the closed position to the open position. Rotating the display relative to the support arms before the support arms in the open position can result in the display engaging the chassis and damaging it. Increasing the force required to rotate the display relative to the support arm can remedy this problem, but results in a display which is difficult to rotate.

Accordingly, it would be desirable to control display rotation on an information handling system absent the disadvantages found in the prior methods discussed above.

SUMMARY

According to one embodiment, a display rotation controlling apparatus includes a base, a plurality of support arms rotatably coupled to the base, at least one support arm including a display coupling member, and a display rotatably coupled to the support arms, the display including at least one support arm coupling member.

BRIEF DESCRIPTION OF THE DRAWINGS

FIG. 2b is a perspective view illustrating an embodiment of the chassis of FIG. 2a.

FIG. 3a is a perspective view illustrating an embodiment of a display used with the chassis of FIGS. 2a and 2b.

FIG. 3b is a perspective view illustrating an embodiment of the display of FIG. 3a.

FIG. 4a is a flow chart illustrating an embodiment of a method for controlling display rotation on an information handling system.

FIG. 4b is a perspective view illustrating an embodiment of the display of FIG. 3a coupled to the chassis of FIG. 2a with the support arms rotated to an open position.

FIG. 4c is a cross sectional view illustrating an embodiment of the display of FIG. 3a engaging the chassis of FIG. 2a.

FIG. 4d is a cross sectional view illustrating an embodiment of the display of FIG. 3a engaging the chassis of FIG. 2a.

FIG. 4e is a cross sectional view illustrating an embodiment of the display of FIG. 3a engaged with the chassis of FIG. 2a.

FIG. 4g is a cross sectional view illustrating an embodiment of the display of FIG. 3a engaged with the chassis of FIG. 2a.

FIG. 4h is a cross sectional view illustrating an embodiment of the display of FIG. 3a disengaging from the chassis of FIG. 2a.

FIG. 4i is a cross sectional view illustrating an embodiment of the display of FIG. 3a disengaged from the chassis of FIG. 2a.

FIG. 4k is a perspective view illustrating an embodiment of the display and chassis of FIG. 4b with the display rotated relative to the chassis approximately 180 degrees.

FIG. 4l is a perspective view illustrating an embodiment of the display and chassis of FIG. 4k with the support arms rotated to a closed position.

FIG. 5b is a cross sectional view illustrating an embodiment of the chassis of FIG. 5a.

FIG. 6a is a perspective view illustrating an embodiment of a support arm used with the chassis of FIG. 5a.

FIG. 6b is a cross sectional view illustrating an embodiment of the support arm of FIG. 6a.

FIG. 7a is a front perspective view illustrating an embodiment of a display used with the chassis of FIGS. 2a and 2b and the support arm of FIGS. 6a and 6b.

FIG. 7b is a rear perspective view illustrating an embodiment of the display of FIG. 7a.

FIG. 7c is a cross sectional view illustrating an embodiment of the display of FIG. 7a.

FIG. 8a is a flow chart illustrating an embodiment of a method for controlling display rotation on an information handling system.

FIG. 8c is a cross sectional view illustrating an embodiment of the plurality of the support arms and the chassis of FIG. 8b.

FIG. 8d is a perspective view illustrating an embodiment of the display of FIGS. 7a, 7b, and 7c coupled to the chassis and support arms of FIG. 8b with the support arms rotated to an open position.

FIG. 8e is a cross sectional view illustrating an embodiment of the display, the chassis, and the support arms of FIG. 8d.

FIG. 8g is a cross sectional view illustrating an embodiment of the display, the support arms, and the chassis of FIG. 8d with the securing catch display coupling member being deactivated.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
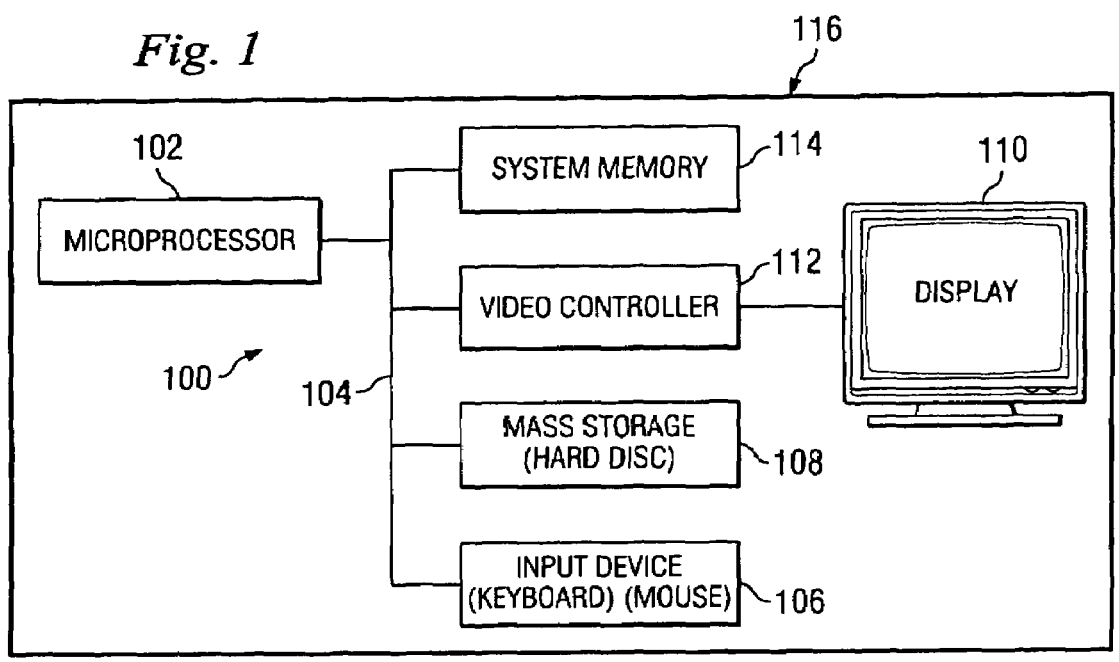
FIG. 1 is a schematic view illustrating an embodiment of an information handling system.

In one embodiment, information handling system 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. Information handling system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other busses and intermediate circuits can be deployed between the components described above and microprocessor 102 to facilitate interconnection between the components and the microprocessor.

Figure 2A:
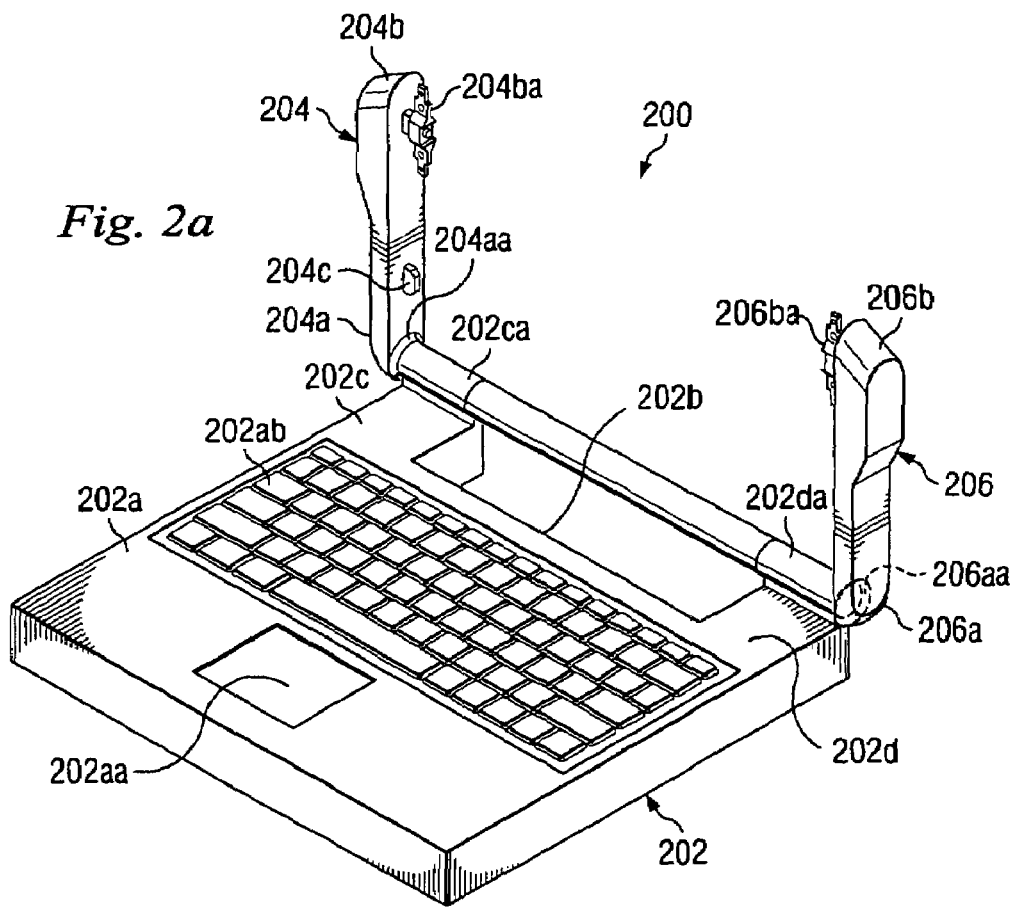
FIG. 2a is a perspective view illustrating an embodiment of a chassis.

Referring now to FIGS. 2a and 2b, a chassis 200 is illustrated. The chassis 200 includes a chassis base 202 having an input device surface 202a, a plurality of input devices 202aa and 202ab located on the input device surface 202a, a rear surface 202b, and a plurality of base beams 202c and 202d extending from opposite ends of the rear surface 202b of the chassis base 202 in a spaced apart relationship. Each of the base beams 202c and 202d include a rotational coupling member 202ca and 202da, respectively, extending from a distal end of the base beam 202c and 202d, respectively. In an embodiment, the chassis base 202 may be, for example, the chassis 116 described above with reference to FIG. 1, and houses some of the components of the information handling system 100 described above with reference to FIG. 1. A support arm 204 having a plurality of opposing distal ends 204a and 204b is rotatably coupled to the rotational coupling member 202ca on the chassis base 202 via a rotational base coupling 204aa extending from the distal end 204a of the support arm 204. A rotational display coupler 204ba is mounted on the support arm 204 and located adjacent the distal end 204b. A securing tooth display coupling member 204c extends from the support arm 204 and is located adjacent the rotational base coupling 204aa on the distal end 204a of the support arm 204. A support arm 206 having a plurality of opposing distal ends 206a and 206b is rotatably coupled to the rotational coupling member 202da on the chassis base 202 via a rotational base coupling 206aa extending from the distal end 206a of the support arm 206. A rotational display coupler 206ba is mounted on the support arm 206 and located adjacent the distal end 206b. A securing tooth display coupling member 206c extends from the support arm 206 and is located adjacent the rotational base coupling 206aa on the distal end 206a of the support arm 206.

Figure 3B:
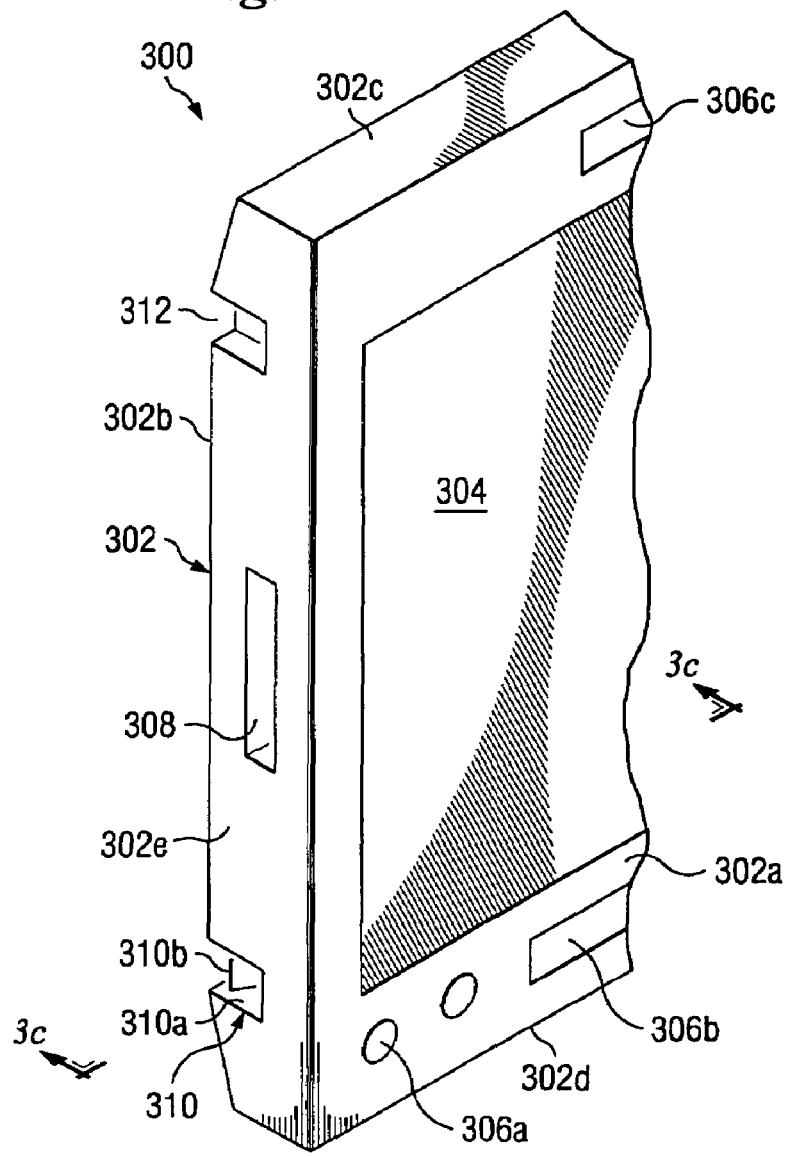
Figure 3C:
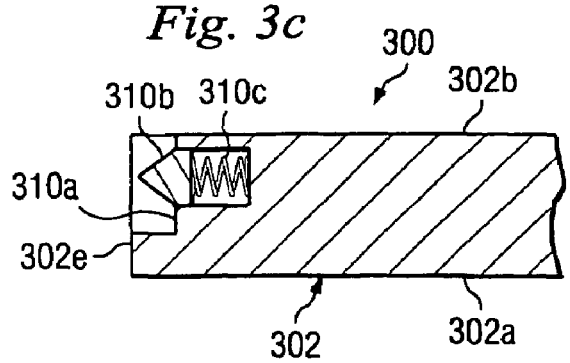
FIG. 3c is a cross sectional view illustrating an embodiment of the display of FIG. 3b.

Referring now to FIGS. 3a, 3b, and 3c, a display 300 is illustrated. The display 300 includes a base 302 having a front surface 302a, a rear surface 302b located opposite the front surface 302a, a top surface 302c extending between the front surface 302a and the rear surface 302b, a bottom surface 302d located opposite the top surface 302c and extending between the front surface 302a and the rear surface 302b, and a pair of opposing side surfaces 302e and 302f extending between the front surface 302a, the rear surface 302b, the top surface 302c and the bottom surface 302d. In an embodiment, the display 300 may be the display 110 described above with reference to FIG. 1. A monitor 304 is located on the front surface 302a of the base 302 and, in an embodiment, the monitor 304 may be an input device such as, for example, a touch screen. A plurality of control devices 306a are located on the front surface 302a of the base 302 between the monitor 304 and the bottom surface 302d. A plurality of indicator devices 306b are located on the front surface 302a of the base 302 between the monitor 304 and the bottom surface 302d. A pen channel 306c is defined by the base 302 and located on the front surface 302a of the base 302 between the monitor 304 and the top surface 302c of the base 302.

A support arm coupling channel 308 is defined by the base 302 and is substantially centrally located on the side surface 302e of the base 302. A support arm coupling member 310 is located on the side surface 302e adjacent the bottom surface 302d of the base 302 and includes a detent channel 310a and a detent 310b which is located in the detent channel 310a and resiliently biased into the detent channel 310a by a resilient member 310c. A display coupling member channel 312 is defined by the base 302 and located on the side surface 302e of the base 302 adjacent the top surface 302c of the base 302 and opposite the detent channel 310a such that the support arm coupling channel 308 is located between the detent channel 310a and the display coupling member channel 312.

A support arm coupling channel 314 is defined by the base 302 and is substantially centrally located on the side surface 302f of the base 302. A support arm coupling member 316 is located on the side surface 302f adjacent the bottom surface 302d of the base 302 and includes a detent channel 316a and a detent 316b which is substantially similar in design and operation to the detent 310b described above. A display coupling member channel 318 is defined by the base 302 and located on the side surface 302f of the base 302 adjacent the top surface 302c of the base 302 and opposite the detent channel 316a such that the support arm coupling channel 314 is located between the detent channel 316a and the display coupling member channel 318.

Referring now to FIGS. 2a, 2b, 3a, 3b, 4a, 4b, and 4c, a method 400 for controlling display rotation on an information handling system is illustrated. The method 400 begins at step 402 where the chassis 200 including the chassis base 202 and the support arms 204 and 206, illustrated in FIGS. 2a and 2b, are provided. The method 400 then proceeds to step 404 where the display 300 is rotatably coupled to the support arms 204 and 206. The rotational display coupler 204ba on support arm 204 is positioned in the support arm coupling channel 308 on the side surface 302e of base 302 and the rotational display coupler 204ba is coupled to the base 302 using convention methods known in the art. The rotational display coupler 206ba on support arm 206 is positioned in the support arm coupling channel 314 on the side surface 302f of base 302 and the rotational display coupler 206ba is coupled to the base 302 using convention methods known in the art. With the display 300 coupled to the support arms 204 and 206 using rotational display couplers 204ba and 206ba, the display 300 is allowed to rotate relative to the support arms 204 and 205 about an axis of rotation A, illustrated in FIG. 4b. In an embodiment, the rotational display couplers 204ba and 206ba are given a torque value which allows the display 300 to rotate about the axis A smoothly and easily upon application of a force by a user.

Figure 4C:
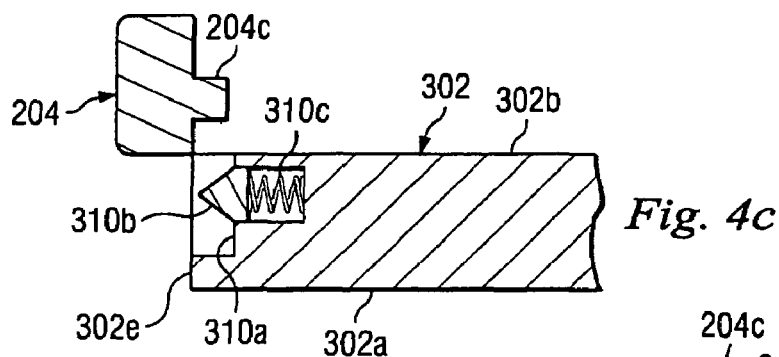
Figure 4D:
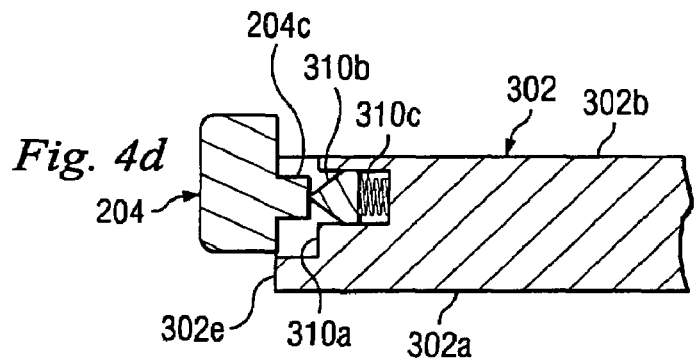
Figure 4E:
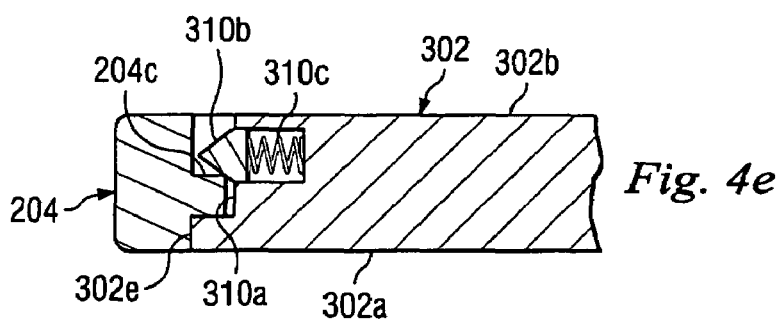

Referring now to FIGS. 2a, 2b, 3b, 4a, 4b, 4c, 4d, 4e, and 4f, the method 400 then proceeds to step 406 where the display 300 is engaged with the support arms 204 and 206. The display 300 is rotated relative to the support arms 204 and 206 and about axis A such that the securing tooth display coupling member 204c enters the detent channel 310a of support arm coupling member 310, as illustrated in FIG. 4c. Contact of the securing tooth display coupling member 204c with the detent 310b causes the detent 310b to resiliently move out of the detent channel 310a by compressing resilient member 310c, as illustrated in FIG. 4d. Continued rotation of the display 300 relative to the support arms 204 and 206 results in the securing tooth display coupling member 204 moving past the detent 310b such that the detent 310b is resiliently biased back into the detent channel 310a in order to hold the securing tooth display coupling member 204c in the detent channel 310a, as illustrated in FIG. 4e. During rotation of the display 300 relative to the support arms 204 and 206, the securing tooth display coupling member 206c enters the detent channel 316a of the support arm coupling member 316 on display 300 and engages the detent 316b in substantially the same manner as described above for securing tooth display coupling member 304c and support arm coupling member 310. With the display 300 engaging the support arms 204 and 206, the support arms 204 and 206 may be rotated about the rotational coupling member 202ca and 202da and relative to the chassis base 202 into a closed position $C_1$, illustrated in FIG. 4f, with the monitor 304 on the front surface 302a of display 300 facing the input device surface 202a. The resilient member 310c resiliently biases the detent 310b into the detent channel 310a with a force which is sufficient such that, during rotation, the display 300 remains between the support arms 204 and 206 and does not rotate relative to the support arms 204 and 206 due to the detents 310a and 316a holding the securing tooth display coupling members 204c and 206c, respectively, in the detent channels 310a and 316b, respectively. In an embodiment, the detent 310b is designed such that the securing tooth display coupling members 204c and 206c may enter the detent channels 310a and 316b with less force than is required to remove the securing tooth display coupling members 204c and 206c from the detent channels 310a and 316b, such that the display 300 may be positioned and secured to the support arms 204 and 206 with relatively little force, but a relatively larger force is required to rotate the display 300 such that it is no longer secured to the support arms 204 and 206.

Figure 4F:
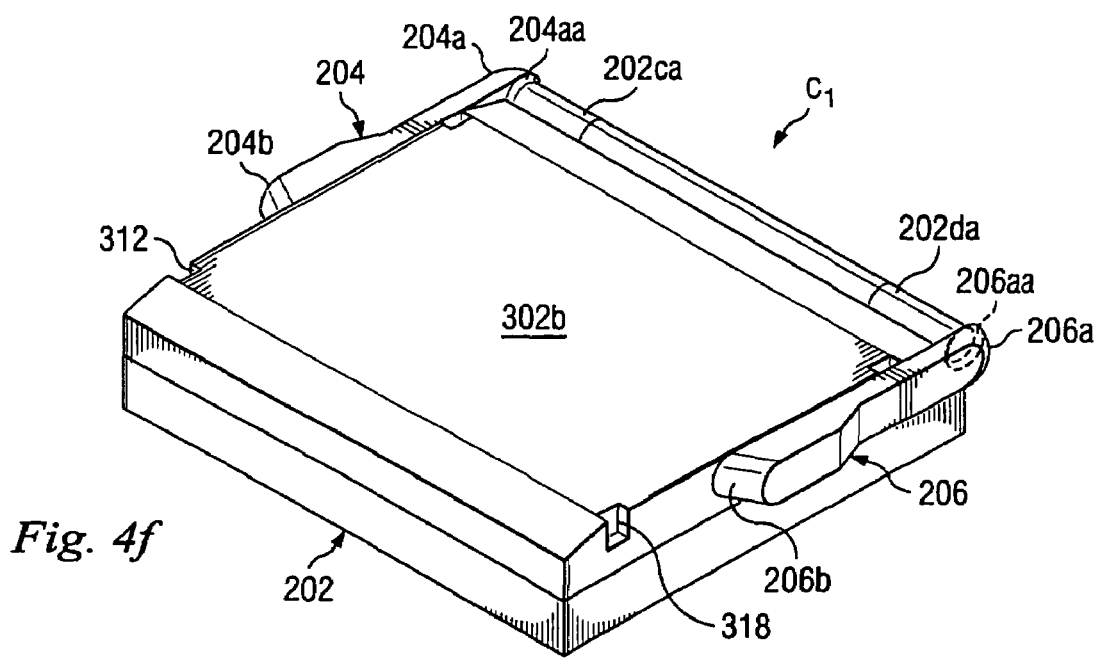
FIG. 4f is a perspective view illustrating an embodiment of the display and chassis of FIG. 4b with the support arms rotated to a closed position.

Referring now to FIGS. 4a, 4b, and 4f, the method 400 then proceeds to step 408 where the support arms 204 and 206 are rotated relative to the chassis base 202 and into an open position. The support arms 204 and 206 are rotated about the rotational coupling member 202ca and 202da and relative to the chassis base 202 into an open position O, illustrated in FIG. 4b. During rotation, the display 300 remains between the support arms 204 and 206 and does not rotate relative to the support arms 204 and 206 due to the detents 310a and 316a holding the securing tooth display coupling members 204c and 206c, respectively, in the detent channels 310a and 316b, respectively. In an embodiment, the rotational coupling between the rotational coupling members 202ca and 202da and the rotational base couplers 204aa and 206aa, respectively, are given a torque value sufficient to support the display 300 while not allowing the chassis base 202 to lift during rotation of the support arms 204 and 206 to the open position O. With the support arms 204 and 206 in the open position O, the display 300 is in a notebook mode and may be used, for example, like a convention notebook information handling system.

Referring now to FIGS. 4a, 4b, 4g, 4h, and 4i, the method 400 proceeds to step 410 where the display 300 is disengaged from the support arms 204 and 206. Once the support arms 204 and 206 have been rotated into the open position O, the display 300 may be disengaged from the support arms 204 and 206 by rotating the display 300 relative to the support arms 204 and 206 and about the axis A such that the securing tooth display coupling member 204c engages the detent 310b and moves the detent 310b resiliently out of the detent channel 310a by compressing the resilient member 310c, as illustrated in FIGS. 4g and 4h. In an embodiment, the rotational coupling between the rotational coupling members 202ca and 202da and the rotational base couplers 204aa and 206aa are designed such that, upon the support arms 204 and 206 reaching the open position O, the support arms 204 and 206 will not substantially rotate further about the rotational coupling members 202ca and 202da, allowing the display 300 to be more easily rotated relative to the support arms 204 and 206 and about the axis A in order to disengaged the securing tooth display coupling member 204c with the detent 310b. Further rotation of the display 300 moves the securing tooth display coupling member 204c past the detent 310b and out of the detent channel 310a, allowing the detent 310b to be resiliently biased back into the detent channel 310a, as illustrated in FIG. 4i. During rotation of the display 300 relative to the support arms 204 and 206, the securing tooth display coupling member 206c is removed from the detent channel 316a in substantially the same manner as the securing tooth display coupling member 204c from the detent channel 310a.

Figure 4J:
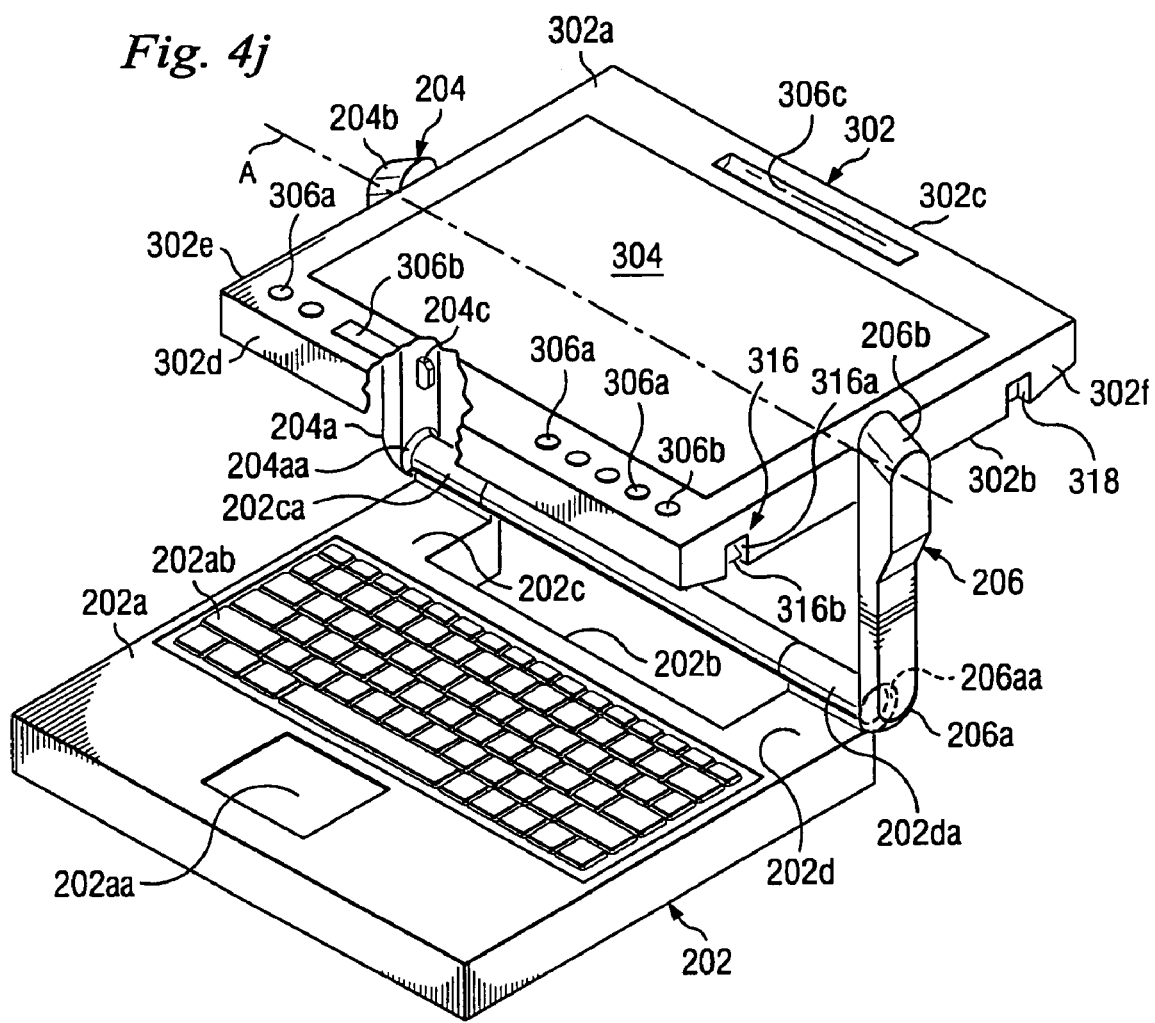
FIG. 4j is a perspective view illustrating an embodiment of the display and chassis of FIG. 4b with the display rotated relative to the chassis.

Referring now to FIGS. 4a, 4b, 4j, and 4k, the method 400 proceeds to step 412 where the display 300 is rotated relative to the support arms 204 and 206. With the securing tooth display coupling members 204c and 206c removed from the detent channels 310a and 316a, the display 300 may be rotated about the axis A and relative to the support arms 204 and 206, as illustrated in FIG. 4j. Rotating the display 300 approximately 180 degrees relative to its orientation in notebook mode, illustrated in FIG. 4b, results in the securing tooth display coupling members 204c and 206c entering the display coupling member channels 312 and 318, respectively, on display 300, as illustrated in FIG. 4k.

Referring now to FIGS. 4a, 4k, and 4l, the method 400 proceeds to step 414 where the support arms 204 and 206 are rotated relative to the chassis base 202 and into the closed position $C_1$. The support arms 204 and 206 are rotated about the rotational coupling member 202ca and 202da and relative to the chassis base 202 into the closed position $C_1$ such that the rear surface 302b of the display 300 faces the input device surface 202a, illustrated in FIG. 4l. With the support arms 204 and 206 in the closed position $C_1$, the display 300 is in a tablet mode and may be used, for example, like a convention tablet information handling system. Thus, a method and apparatus are provided which control the display rotation on an information handling system converting from a notebook mode to a tablet mode in order to protect the information handling system chassis from damage.

Figure 5A:
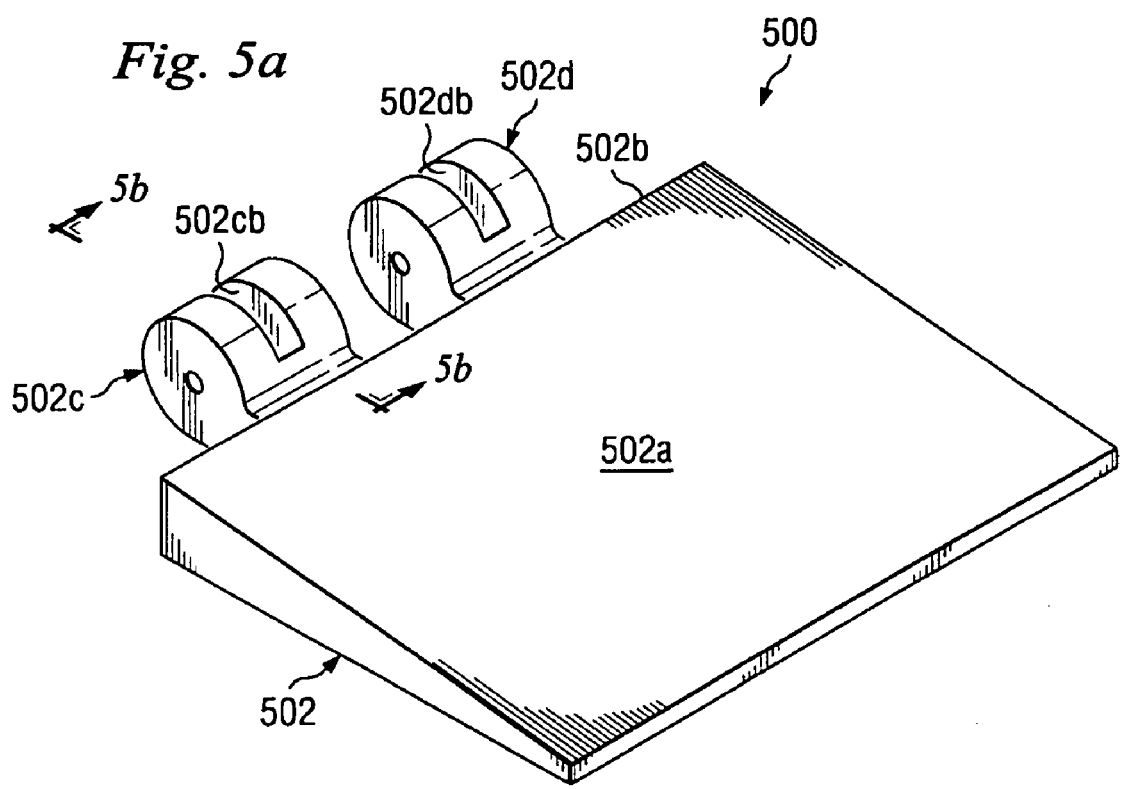
FIG. 5a is a perspective view illustrating an embodiment of a chassis.
Figure 5B:
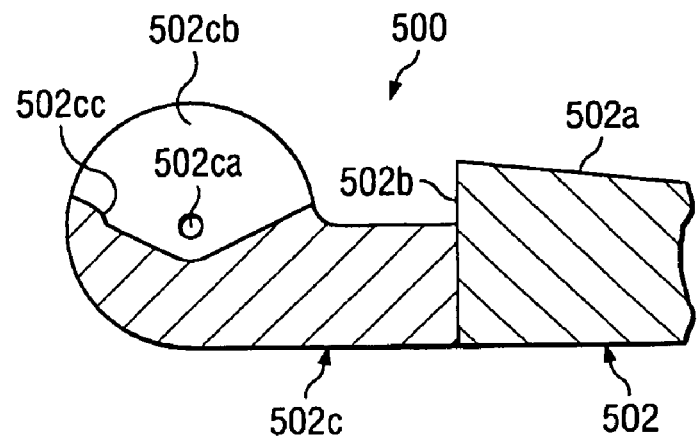

Referring now to FIGS. 5a and 5b, in an embodiment, a chassis 500 is illustrated. The chassis 500 includes a chassis base 502 having an input device surface 502a, a rear surface 502b, and a plurality of base beams 502c and 502d extending from the rear surface 502b of the chassis base 502 in a spaced apart relationship. The base beam 502c includes a rotational coupling member 502ca located in support arm rotation channel 502cb defined by the base beam 502c and having a securing catch release member 502cc located on a surface adjacent the support arm rotation channel 502cb. The base beam 502d is substantially similar in design and operation to the base beam 502c and includes a rotational coupling member 502da (not shown) located in support arm rotation channel 502db defined by the base beam 502d and having a securing catch release member 502dc (not shown) located on a surface adjacent the support arm rotation channel 502db. In an embodiment, the chassis base 502 may be, for example, the chassis 116 described above with reference to FIG. 1, and houses some of the components of the information handling system 100 described above with reference to FIG. 1.

Figure 6A:
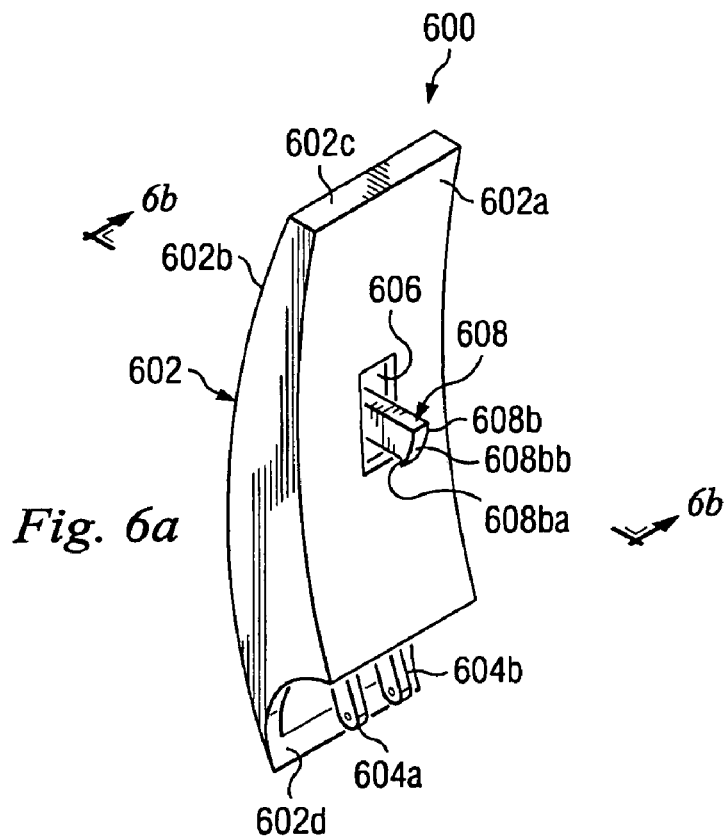
Figure 6B:
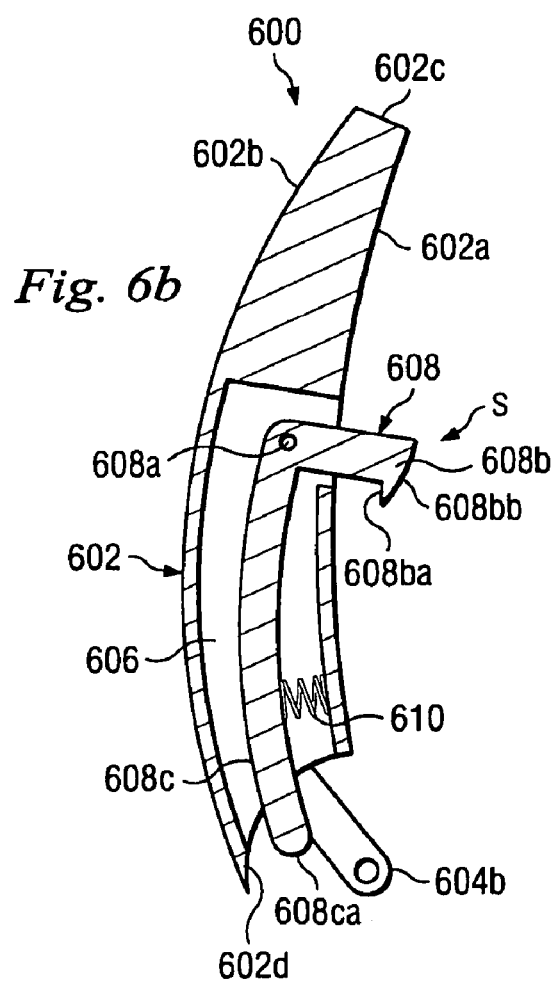

Referring now to FIGS. 6a and 6b, in an embodiment, a support arm 600 is illustrated. Support arm 600 includes an arcuate and elongated base member 602 including a front surface 602a, a rear surface 602b located opposite the front surface 602a, a distal end 602c extending between the front surface 602a and the rear surface 602b, and an arcuate distal end 602d located opposite the distal end 602c and extending between the front surface 602a and the rear surface 602b. A plurality of rotational base couplings 604a and 604b extend from the distal end 602d of the support arm 600. A securing catch channel 606 is defined by the base 602 and extends from approximately the midpoint of the base 602 to the distal end 602d. A securing catch display coupling member 608 is located in the securing catch channel 606 and pivotally coupled to the base 602 at a pivot point 608a. The securing catch display coupling member 608 includes a securing catch 608b having a catch surface 608ba and a beveled surface 608bb extending out of the securing catch channel 606 and past the front surface 602a of the base 602. An elongated pivot arm 608c extends from the securing catch 608b and along the length of the securing catch channel 606 and includes an activation surface 608ca on its distal end which extends past the distal end 602d of the base 602. A resilient member 610 is coupled to the pivot arm 608c and the base 602, located in the securing catch channel 606, and resiliently biases the securing catch 608b into a securing position S, illustrated in FIG. 6b.

Referring now to FIGS. 7a, 7b, and 7c, in an embodiment, a display 700 is illustrated. The display 700 includes a base 702 having a front surface 702a, a rear surface 702b located opposite the front surface 702a, a top surface 702c extending between the front surface 702a and the rear surface 702b, a bottom surface 702d located opposite the top surface 702c and extending between the front surface 702a and the rear surface 702b, and a pair of opposing side surfaces 702e and 702f extending between the front surface 702a, the rear surface 702b, the top surface 702c and the bottom surface 702d. In an embodiment, the display 700 may be the display 110 described above with reference to FIG. 1. A monitor 704 is located on the front surface 702a of the base 702 and, in an embodiment, the monitor 704 may be an input device such as, for example, a touch screen. A plurality of hinge members 706 are mounted to the rear surface 702b of the base 702 in a centrally located spaced apart relationship, each hinge member 706 including a support arm coupling surface 706a. A plurality of catch channel support arm coupling members 708 are defined by the base 702 in a spaced apart relationship adjacent each of the hinge members 706, each catch channel support arm coupling members 708 including a catch surface 708a.

Figure 8B:
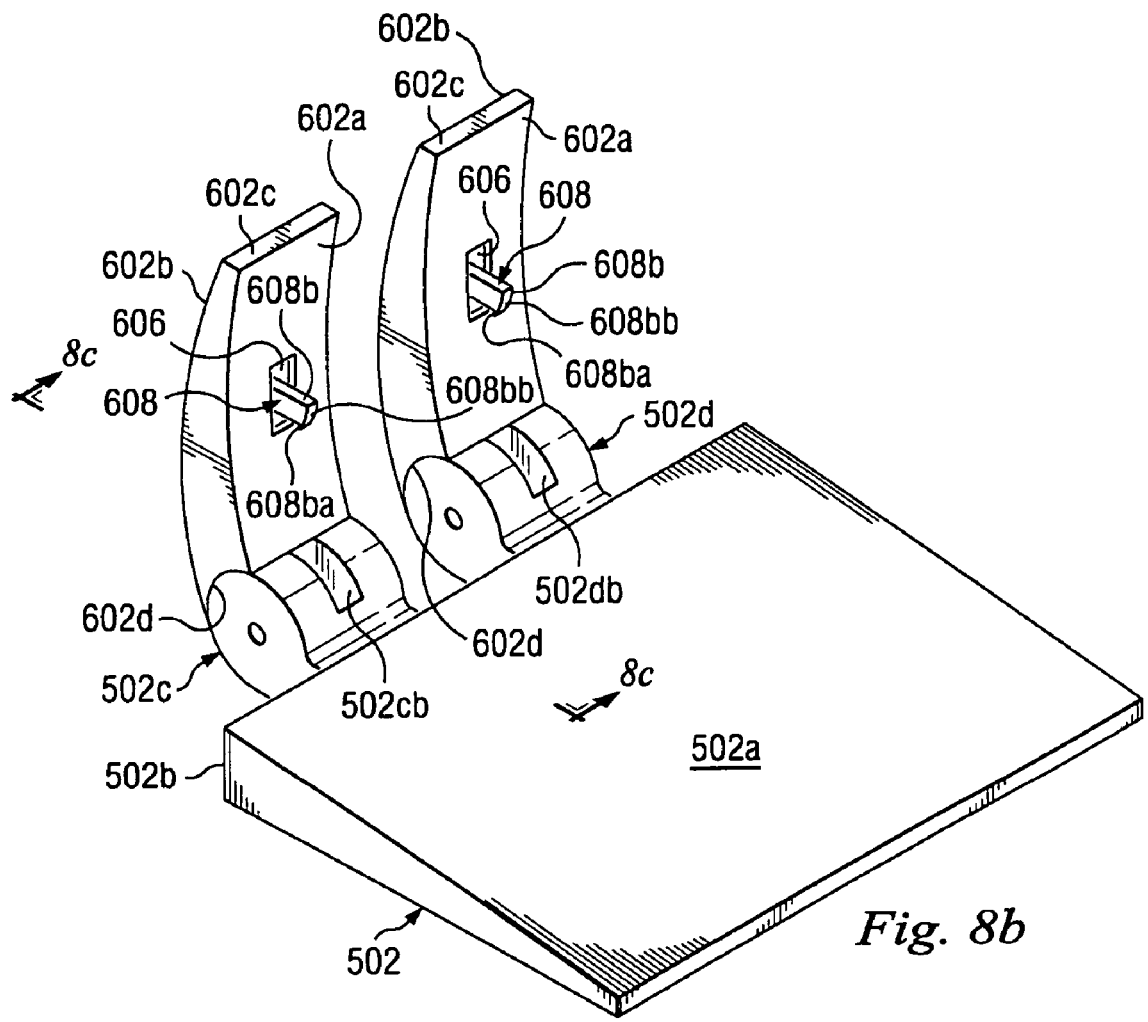
FIG. 8b is a perspective view illustrating an embodiment of a plurality of the support arms of FIGS. 6a and 6b coupled to the chassis of FIGS. 5a and 5b.

Referring now to FIGS. 5a, 5b, 6a, 6b, 8a, 8b, and 8c, in an embodiment, a method 800 for controlling display rotation on an information handling system is illustrated. The method 800 begins at step 802 where the chassis 500 including the chassis base 502 and a plurality of the support arms 600 are provided. A support arm 600 is rotatably coupled to the base beam 502c on chassis 500 by positioning the distal end 602d on support arm 600 adjacent the support arm rotation channel 502*cb* and coupling the rotational base couplings 604*a* and 604*b* on base beam 600 to the rotational coupling member 502*ca* in support arm rotation channel 502*cb* on chassis 500, as illustrated in FIG. 8*c*. A support arm 600 may be rotatably coupled to the base beam 502*d* in substantially the same manner as described above for coupling a support arm 600 to the base beam 502*c*, as illustrated in FIG. 8*b*.

Referring now to FIGS. 7*a*, 7*b*, 7*c*, 8*a*, 8*b*, 8*c*, 8*d*, 8*e*, and 8*f*, the method 800 then proceeds to step 804 where the display 700 is rotatably coupled to the support arms 600. The support arm coupling surface 706*a* on each of the plurality of hinge members 706 is coupled to the distal end 602*c* on each of the plurality of support arms 600. With the display 700 coupled to the support arms 600 using the hinges 706, the display 700 is allowed to rotate relative to the support arms 600 about an axis of rotation B, illustrated in FIG. 4*b*. In an embodiment, the hinges 706 are given a torque value which allows the display 700 to rotate about the axis B smoothly and easily upon application of a force by a user. The method 700 then proceeds to step 806 where the display 700 is engaged with the support arms 600. The display 700 is rotated relative to the support arms 600 and about axis B to bring the rear surface 702*b* of the display 700 adjacent the front surface 602*a* of the supports arms 600. When the rear surface 702*b* of the display engages the beveled surface 608*bb* of the securing catches 608*b*, the securing catch display coupling members 608 rotate about the pivot point 608*a* such that the securing catches 608*b* enters the catch channel support arm coupling members 708 and are resiliently biased into the securing position S. With the securing catches 608*b* positioned in the catch channel support arm coupling members 708, the catch surface 608*ba* on securing catches 608*b* engages the catch surface 708*a* in catch channel support arm coupling members 708, as illustrated in FIG. 8*e*. With the display 700 engaging the support arms 600, the support arms 600 may be rotated about the rotational coupling member 502*ca* and 502*da* on base beams 502*c* and 502*d*, respectively, and relative to the chassis base 502 into a closed position $C_2$, illustrated in FIG. 8*f*, with the monitor 704 on the front surface 702*a* of display 700 facing the input device surface 702*a*. The resilient member 610 resiliently biases the securing catches 608*b* into the catch channel support arm coupling members 708 such that, during rotation, the rear surface 702*b* of the display 700 remains adjacent the support arms 600 and does not rotate relative to the support arms 600.

Figure 8F:
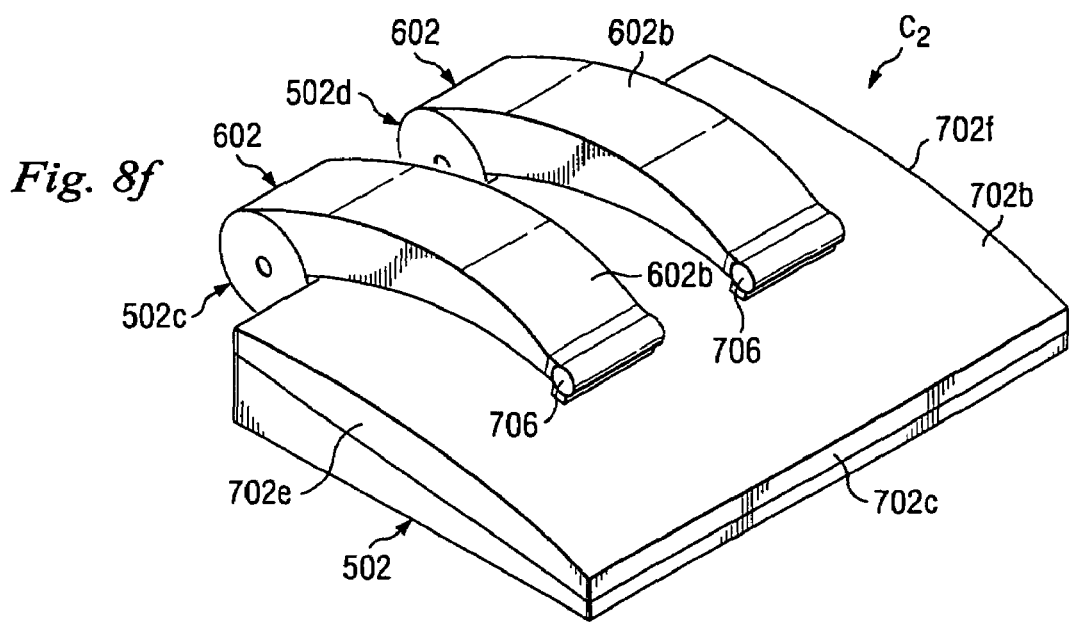
FIG. 8f is a perspective view illustrating an embodiment of the display, the chassis, and the support arms of FIG. 8d with the support arms rotated to a closed position.

Referring now to FIGS. 8*a*, 8*d*, and 8*f*, the method 800 then proceeds to step 808 where the support arms 600 are rotated relative to the chassis base 502 and into an open position. The support arms 600 are rotated about the rotational coupling member 502*ca* and 502*da* and relative to the chassis base 502 into an open position $O_2$, illustrated in FIG. 8*d*. During rotation, the rear surface 702*b* of display 700 remains adjacent the support arms 600 and does not rotate relative to the support arms 600 due to the engagement of the securing catches 608*b* with the catch channel support arm coupling members 708. In an embodiment, the rotational coupling between the rotational coupling members 502*ca* and 502*da* and the support arms 600, are given a torque value sufficient to support the display 700 while not allowing the chassis base 502 to lift during rotation of the support arms 600 to the open position $O_2$. With the support arms 600 in the open position $O_1$, the display 700 is in a notebook mode and may be used, for example, like a convention notebook information handling system.

Figure 8H:
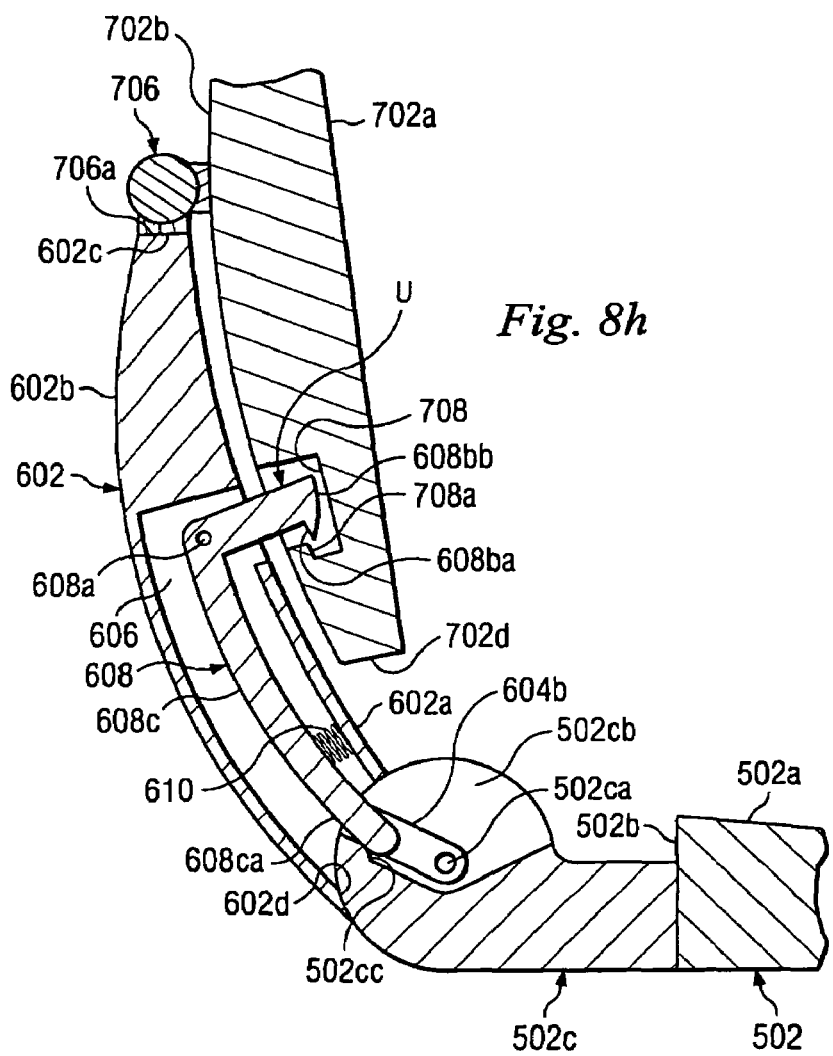
FIG. 8h is a cross sectional view illustrating an embodiment of the display, the support arms, and the chassis of FIG. 8d with the securing catch display coupling member deactivated.

Referring now to FIGS. 8*a*, 8*d*, 8*g*, and 8*h*, the method 700 proceeds to step 810 where the display 700 is disengaged from the support arms 600. Once the support arms 600 have been rotated into the open position $O_2$, the display 700 may be disengaged from the support arms 600 by rotating the support arms 600 further about the base beams 502*c* and 502*d* such that securing catch release members 502*cc* and 502*dc* on base beams 502*c* and 502*d*, respectively, engage the activation surfaces 608*ca* on securing catch display coupling members 608 in support arms 600, as illustrated in FIG. 8*g*. Further rotation of the support arms 600 relative to the base beams 502*c* and 502*d* results in the rotation of the securing catch display coupling member 608 about the pivot point 608*a*, moving the securing catch 608 into a unsecured position U with the catch surface 608*ba* on securing catch 608*b* disengaged from the catch surface 708*a* in catch channel support arm coupling member 708, as illustrated in FIG. 8*h*.

Figure 8I:
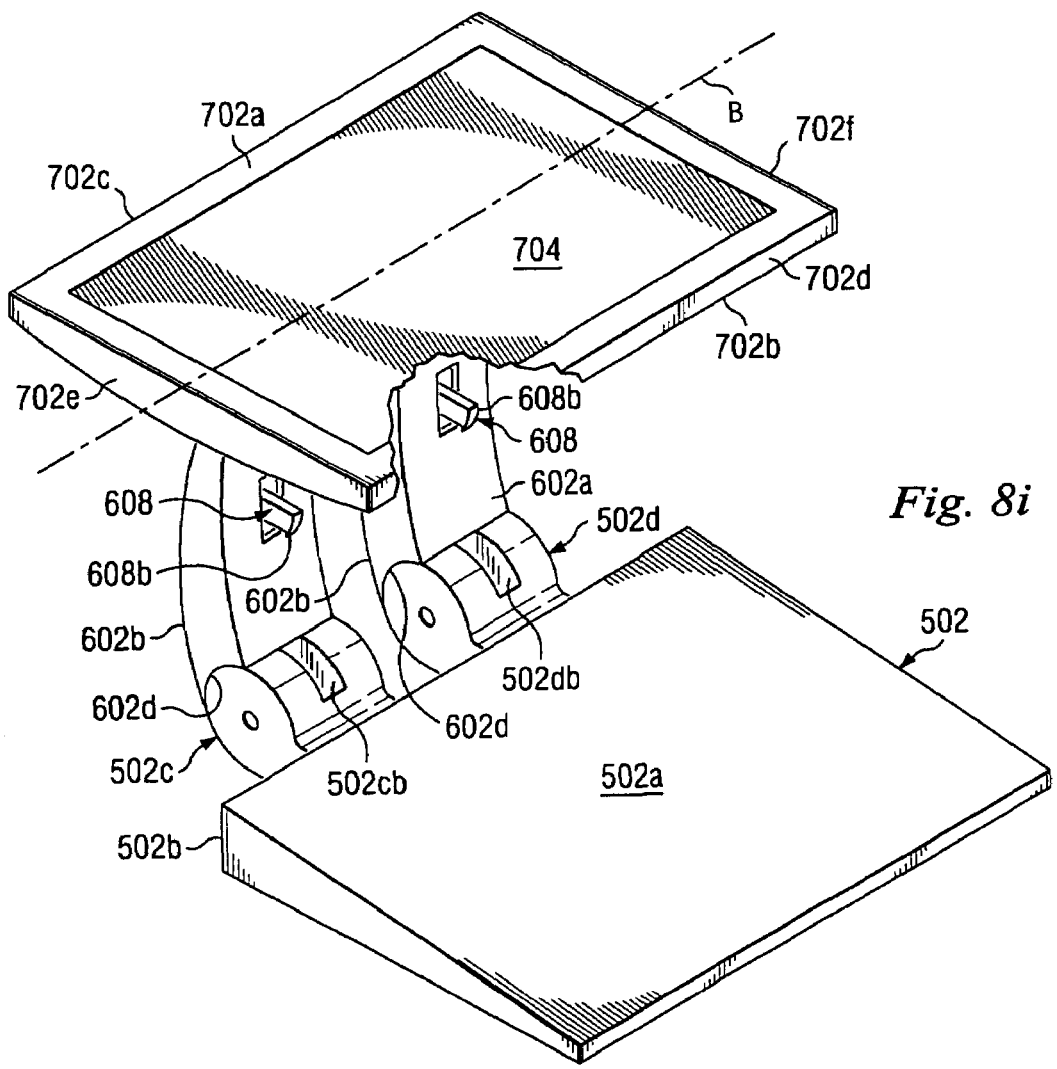
FIG. 8i is a perspective view illustrating an embodiment of the display, the support arms, and the chassis of FIG. 8d with the display rotated relative to the chassis.
Figure 8K:
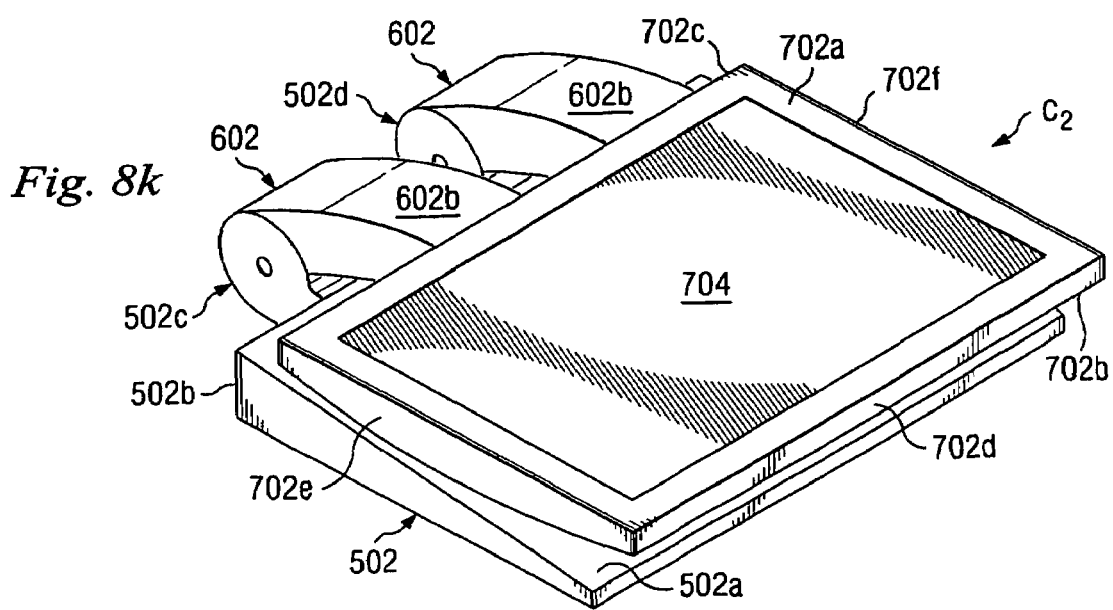
FIG. 8k is a perspective view illustrating an embodiment of the display, the support arms, and the chassis of FIG. 8j with the support arms rotated to a closed position.
Figure 8J:
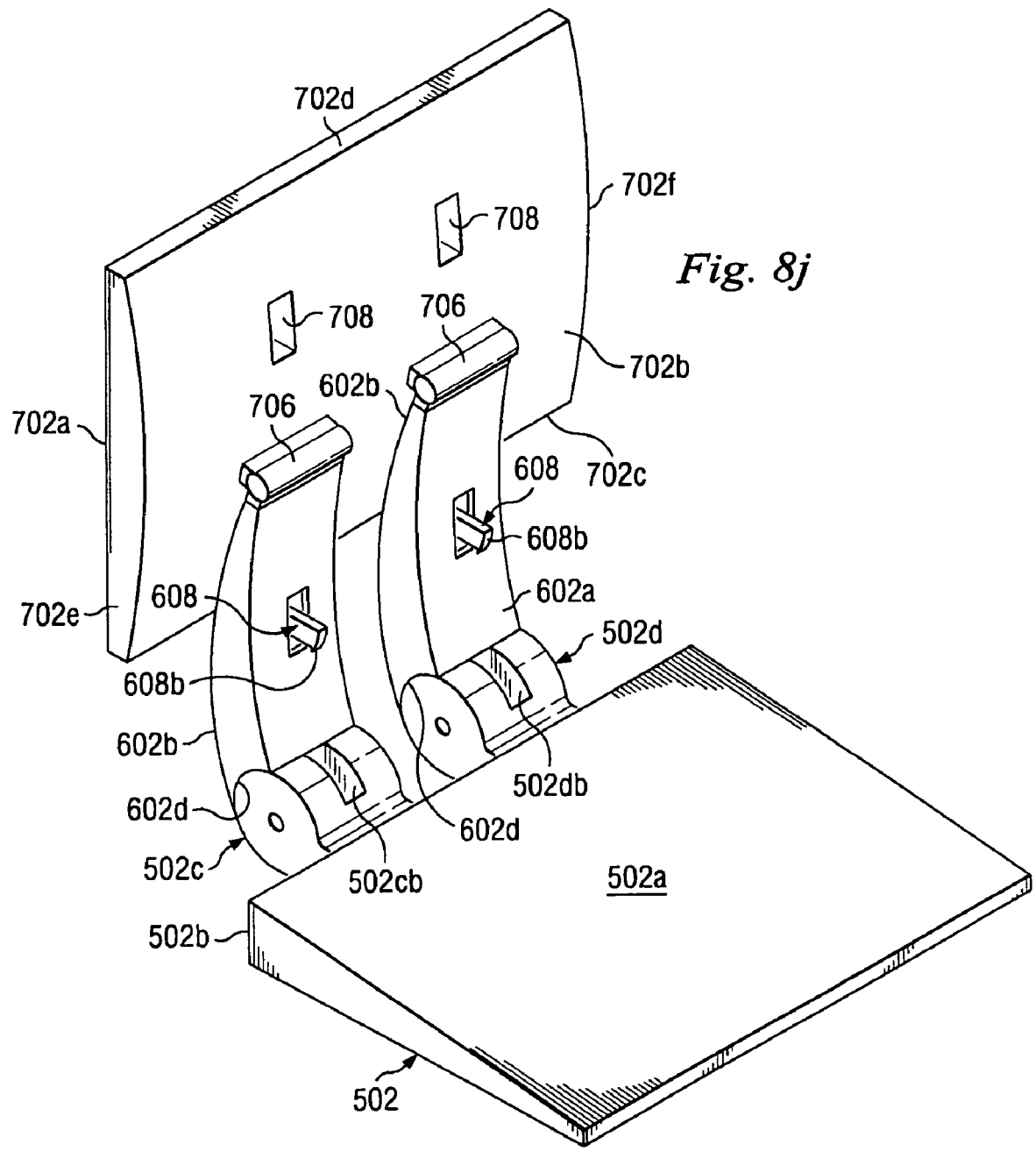
FIG. 8j is a perspective view illustrating an embodiment of the display, the support arms, and the chassis of FIG. 8d with the display rotated relative to the chassis approximately 180 degrees.

Referring now to FIGS. 8*a*, 8*d*, 8*i*, 8*j*, and 8*k*, the method 800 proceeds to step 812 where the display 700 is rotated relative to the support arms 600. With the securing catch display coupling members 608 disengages from the catch channel support arm coupling members 708, the display 700 may be rotated about the axis B and relative to the support arms 600, as illustrated in FIG. 8*i*. The display 700 is rotated approximately 180 degrees relative to its orientation in notebook mode, illustrated in FIG. 8*d*, such that the rear surface 702*b* on the display 700 is adjacent the rear surface 602*b* on the support arms 600, as illustrated in FIG. 8*j*.

Referring now to FIGS. 8*a*, 8*j*, and 8*k*, the method 800 proceeds to step 814 where the support arms 600 are rotated relative to the chassis base 502 and into the closed position. The support arms 600 are rotated about the rotational coupling member 502*ca* and 502*da* on base beams 502*c* and 502*d*, respectively, and relative to the chassis base 202 into the closed position $C_2$ such that the rear surface 702*b* of the display 700 faces the input device surface 502*a*, illustrated in FIG. 8*k*. With the support arms 600 in the closed position $C_2$, the display 700 is in a tablet mode and may be used, for example, like a convention tablet information handling system. Thus, a method and apparatus are provided which control the display rotation on an information handling system converting from a notebook mode to a tablet mode in order to protect the information handling system chassis from damage.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A display rotation controlling apparatus comprising:
   a base;
   a plurality of support arms rotatably coupled to the base, at least one support arm including a display coupling member, wherein the display coupling member comprises a securing tooth extending from the support arm; and
   a display rotatably coupled to the support arms, the display including at least one support arm coupling member that comprises a detent that is resiliently biased out of a surface on the display, wherein the securing tooth is resiliently biased out of a surface on the display, wherein the securing tooth is operable to move the detent relative to the surface on the display in response to the rotation of the display in order to engage the securing tooth and the detent in a manner that holds the display in a tablet mode.

2. The apparatus of claim 1 wherein the support arm coupling member comprises a detent channel defined by the display, wherein the detent is moveably coupled to the display and positioned in the detent channel.

3. The apparatus of claim 2 wherein the detent is operable to hold the securing tooth in the detent channel during the rotation of the plurality of support arms from a closed position to an open position.

4. The apparatus of claim 1 further comprising:
a display coupling member channel defined by the display, whereby the support arm coupling member and the display coupling member channel are positioned on opposite sides of the axis of rotation of the display.

5. An information handling system comprising:
a chassis base;
a microprocessor mounted to the chassis base;
a memory coupled to the microprocessor;
a plurality of support arms rotatably coupled to the chassis base, at least one support arm including a display coupling member, wherein the display coupling member comprises a securing tooth extending from the support arm; and
a display electrically coupled to the microprocessor and rotatably coupled to the support arms, the display including at least one support arm coupling member that comprises a detent that is resiliently biased out of a surface on the display, wherein the securing tooth is resiliently biased out of a surface on the display, wherein the securing tooth is operable to move the detent relative to the surface on the display in response to the rotation of the display in order to engage the securing tooth and the detent in a manner that holds the display in a tablet mode.

6. The system of claim 5 wherein the support arm coupling member comprises a detent channel defined by the display, wherein the detent is moveably coupled to the display and positioned in the detent channel.

7. The system of claim 6 wherein the detent is operable to hold the securing tooth in the detent channel during the rotation of the plurality of support arms from a closed position to an open position.

8. The system of claim 5 further comprising:
a display coupling member channel defined by the display, whereby the support arm coupling member and the display coupling member channel are positioned on opposite sides of the axis of rotation of the display.

9. A method for controlling display rotation on an information handling system comprising:
providing a chassis base comprising a plurality of support arms rotatably coupled to the chassis base, at least one support arm comprising a display coupling member, wherein the display coupling member comprises a securing tooth extending from the support arm; and
rotatably coupling a display to the plurality of support arms, the display comprising at least one support arm coupling member that comprises a detent that is resiliently biased out of a surface on the display, wherein the securing tooth is resiliently biased out of a surface on the display, wherein the securing tooth is operable to move the detent relative to the surface on the display in response to the rotation of the display in order to engage the securing tooth and the detent in a manner that holds the display in a tablet mode.

10. The method of claim 9 further comprising:
engaging the securing tooth and the detent such that the display is held in the tablet mode;
rotating the support arms relative to the chassis base, whereby the engagement of the securing tooth and the detent prevent rotation of the display relative to the support arms during rotation of the support arms from a closed position to an open position;
disengaging the securing tooth and the detent upon the support arms reaching the open position;
rotating the display substantially 180 degrees relative to the support arms; and
rotating the support arms relative to the chassis base and into the closed position.

* * * * *

UNITED STATES PATENT AND TRADEMARK OFFICE
CERTIFICATE OF CORRECTION

| | | |
|---|---|---|
| PATENT NO. | : 7,566,033 B2 | |
| APPLICATION NO. | : 11/227391 | |
| DATED | : July 28, 2009 | |
| INVENTOR(S) | : Mark A. Schwager et al. | |

It is certified that error appears in the above-identified patent and that said Letters Patent is hereby corrected as shown below:

Claim 1, Column 10, Lines 61 and 62, delete "wherein the securing tooth is resiliently biased out of a surface on the display,"

Claim 5, Column 11, Lines 27 and 28, delete "wherein the securing tooth is resiliently biased out of a surface on the display,"

Claim 9, Column 12, Lines 18-20, delete "wherein the securing tooth is resiliently biased out of a surface on the display,"

Signed and Sealed this

Ninth Day of February, 2010

David J. Kappos
*Director of the United States Patent and Trademark Office*